US011218215B2

(12) United States Patent
Babich

(10) Patent No.: US 11,218,215 B2
(45) Date of Patent: Jan. 4, 2022

(54) OPTIMIZING THE LOCATION OF AN ANTENNA SYSTEM IN A LOW LATENCY/LOW DATA BANDWIDTH LINK USED IN CONJUNCTION WITH A HIGH LATENCY/HIGH BANDWIDTH LINK

(71) Applicant: Skywave Networks LLC, Chicago, IL (US)

(72) Inventor: Kevin J. Babich, Valparaiso, IN (US)

(73) Assignee: Skywave Networks LLC, Chicago, IL (US)

( * ) Notice: Subject to any disclaimer, the term of this patent is extended or adjusted under 35 U.S.C. 154(b) by 0 days.

(21) Appl. No.: 15/929,247

(22) Filed: Apr. 1, 2020

(65) Prior Publication Data

US 2020/0366367 A1    Nov. 19, 2020

Related U.S. Application Data

(63) Continuation of application No. PCT/US2018/053704, filed on Oct. 1, 2018.
(Continued)

(51) Int. Cl.
*H04B 7/22* (2006.01)
*H04W 40/06* (2009.01)
(Continued)

(52) U.S. Cl.
CPC .............. *H04B 7/22* (2013.01); *H04W 40/06* (2013.01); *H04W 40/12* (2013.01); *H04W 40/22* (2013.01); *H04W 56/0005* (2013.01)

(58) Field of Classification Search
CPC ........ H04B 7/22; H04W 40/06; H04W 40/12; H04W 40/22; H04W 56/0005
See application file for complete search history.

(56) References Cited

U.S. PATENT DOCUMENTS 3,346,864 A    10/1967    Harmon
4,699,511 A *  10/1987    Seaver ................ G01N 21/431
                                                          356/135
(Continued)

FOREIGN PATENT DOCUMENTS

WO    2016094392 A1    6/2016

OTHER PUBLICATIONS

Lee, William C.Y., Studies of Base-Station Antenna Height Effects on Mobile Radio Retrieved from the Internet: https://ieeexplore.ieee.org/document/1622762, May 1, 1980.
(Continued)

*Primary Examiner* — Dominic E Rego
(74) *Attorney, Agent, or Firm* — Woodard, Emhardt, Henry, Reeves & Wagner, LLP

(57) ABSTRACT

A communication system uses multiple communications links that may include a high latency/high bandwidth link using a fiber-optic cable configured to carry large volumes of data but having a high latency. The communications links may include a low latency/low bandwidth link using skywave propagation of radio waves and configured to carry smaller volumes of data with a lower latency. The low latency/low bandwidth link employs a transmitting antenna system where aspects such as antenna height, type of ground, and typography of the surrounding area at the transmitting site are adjusted to optimize the direction and angle of propagation. Controlling these and other aspects increases the predictability and reliability of the wireless link by managing the number of hops and skip distance between the transmitting and receiving antennas. The two communications links may be used together to coordinate various activities such as the buying and selling of financial instruments.

15 Claims, 13 Drawing Sheets

Related U.S. Application Data

(60) Provisional application No. 62/566,677, filed on Oct. 2, 2017.

(51) Int. Cl.
*H04W 40/12* (2009.01)
*H04W 40/22* (2009.01)
*H04W 56/00* (2009.01)

(56) References Cited

U.S. PATENT DOCUMENTS

| | | | |
|---|---|---|---|
| 4,796,708 A * | 1/1989 | Lembcke | E21B 47/13 166/66.7 |
| 4,825,224 A | 4/1989 | Grose et al. | |
| 4,962,488 A | 10/1990 | Dell-Imagine et al. | |
| 4,983,984 A * | 1/1991 | Shibano | G01S 1/04 342/457 |
| 5,764,195 A | 6/1998 | Colclough et al. | |
| 6,549,529 B1 * | 4/2003 | Drabeck | H01Q 1/246 370/347 |
| 6,831,592 B2 * | 12/2004 | Perry | G01S 13/0218 342/159 |
| 7,061,438 B2 * | 6/2006 | Aquino | B66C 13/40 343/713 |
| 7,385,443 B1 * | 6/2008 | Denison | A61B 5/7228 330/9 |
| 9,000,990 B2 * | 4/2015 | Magid | H01Q 21/28 343/715 |
| 9,136,938 B1 * | 9/2015 | Babich | H04L 45/24 |
| 9,231,832 B2 | 1/2016 | Aharony | |
| 9,578,540 B1 | 2/2017 | Adams | |
| 9,584,232 B1 * | 2/2017 | Dolan | H04B 17/345 |
| 10,080,144 B1 * | 9/2018 | Wills | G01S 5/021 |
| 10,505,635 B2 * | 12/2019 | Wala | H04N 19/91 |
| 2002/0070870 A1 * | 6/2002 | Huang | B66C 15/045 340/685 |
| 2002/0097191 A1 * | 7/2002 | Harel | H01Q 3/267 343/890 |
| 2005/0102072 A1 * | 5/2005 | Deakin | B63B 49/00 701/21 |
| 2005/0124304 A1 * | 6/2005 | Bendov | H04B 17/103 455/115.1 |
| 2007/0025464 A1 | 2/2007 | Perlman | |
| 2007/0232364 A1 | 10/2007 | Troutman | |
| 2008/0031378 A1 * | 2/2008 | Taylor | H04L 25/03834 375/295 |
| 2008/0109086 A1 * | 5/2008 | Voegele | A61F 5/0086 623/23.65 |
| 2008/0143621 A1 * | 6/2008 | Diaz | H01Q 15/0053 343/742 |
| 2009/0305710 A1 * | 12/2009 | Johnson | H01Q 15/14 455/446 |
| 2010/0028004 A1 * | 2/2010 | Nishino | H04B 10/07955 398/79 |
| 2010/0164785 A1 * | 7/2010 | Gebert | H01Q 1/28 342/25 F |
| 2012/0082464 A1 * | 4/2012 | Yasuda | H04B 10/6166 398/152 |
| 2013/0097880 A1 * | 4/2013 | Wernig | H01Q 3/005 33/228 |
| 2013/0188952 A1 * | 7/2013 | Peach | H04B 10/25758 398/65 |
| 2014/0062806 A1 * | 3/2014 | Higby | H01Q 3/01 343/713 |
| 2014/0086588 A1 | 3/2014 | Kawanishi et al. | |
| 2014/0327563 A1 * | 11/2014 | Norland | G01S 13/88 342/27 |
| 2015/0018044 A1 * | 1/2015 | Sekine | H04W 88/085 455/561 |
| 2015/0312924 A1 * | 10/2015 | Yu | H04W 72/0446 370/336 |
| 2016/0173360 A1 | 6/2016 | Goldin et al. | |
| 2016/0197669 A1 * | 7/2016 | Babich | H04B 7/18504 370/315 |
| 2017/0026125 A1 * | 1/2017 | Middleton | H01S 5/0085 |
| 2017/0229787 A1 * | 8/2017 | Fenn | H01Q 21/24 |
| 2017/0230100 A1 | 8/2017 | Babich | |
| 2020/0244352 A1 | 7/2020 | Babich | |
| 2020/0328841 A1 | 10/2020 | Babich et al. | |
| 2020/0328844 A1 | 10/2020 | Babich et al. | |
| 2020/0328918 A1 | 10/2020 | Babich et al. | |
| 2020/0328919 A1 | 10/2020 | Babich et al. | |
| 2021/0058150 A1 | 2/2021 | Babich | |
| 2021/0058151 A1 | 2/2021 | Babich | |
| 2021/0067239 A1 | 3/2021 | Babich | |
| 2021/0075494 A1 | 3/2021 | Babich | |
| 2021/0075502 A1 | 3/2021 | Babich | |
| 2021/0075562 A1 | 3/2021 | Babich | |
| 2021/0075584 A1 | 3/2021 | Babich | |
| 2021/0105044 A1 | 4/2021 | Babich | |

OTHER PUBLICATIONS

Siwiak, Kazimierz, An Optimum Height for an Elevated HF Antenna. QEX pp. 32-39 Retrieved from the Internet http://www.arrl.org/files/file/QEX_Next_Issue/May-Jun_2011/QEX_5_1 1_Siwiak.pdf, May 1, 2011.

The American Radio Relay League-Semantic Scholar, Antenna Book for Radio Communication: The Effects of Ground, Chapter 3 Effects of Ground, pp. 13-23, table 2, figure 23 Retrieved from the Internet: https://www.qrz.ru/schemes/contribute/arrl/chap3.pdf, Sep. 1, 2015.

Arikan, Toros, Thesis—Minimum-Delay HF Communications, University of Illinois at Urbana-Champaign, 60 pages Retrieved from the Internet: https://www.ideals.illinois.edu/bitstream/handle/2142/97507/ARIKAN-THESIS-2017.pdf?sequence=1, Nov. 28, 2017.

Wikipedia, Ground Plane Section 1: Radio Antenna Theory Retrieved from the Internet: https://en.wikipedia.org/wiki/Ground_planeRadio_antenna_theory, Mar. 31, 2020.

Lee, William C.Y., Studies of Base-Station Antenna Height Effects on Mobile Radio Retrieved from the Internet: https://ieeexplore.ieee.org/document/1622762, 10 pages, May 1, 1980.

Frederick H. Raab et al., Raab, F.H et al., "HF, VHF, and UHF Systems and Technology", IEEE Transaction on Microwave Theory and Techniques, vol. 50, issue No. 3, pp. 888-899., 12 pages, Mar. 1, 2002.

EPO, European Patent Application No. 18863920.7 Extended European Search Report, 11 pages, dated May 25, 2021.

\* cited by examiner

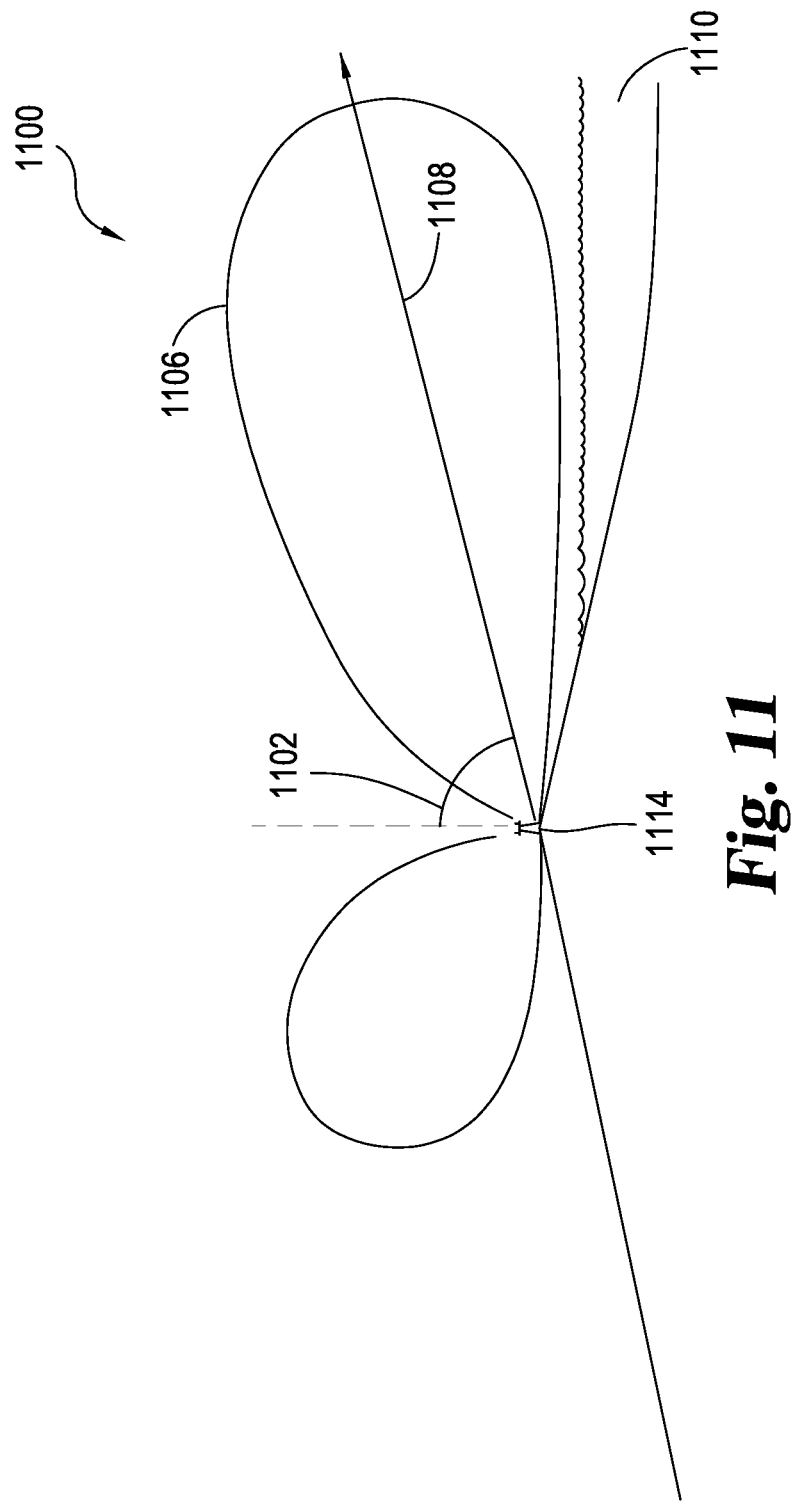

OPTIMIZING THE LOCATION OF AN ANTENNA SYSTEM IN A LOW LATENCY/LOW DATA BANDWIDTH LINK USED IN CONJUNCTION WITH A HIGH LATENCY/HIGH BANDWIDTH LINK

CROSS-REFERENCE TO RELATED APPLICATION

This application is a continuation of International Application No. PCT/US2018/053704 filed Oct. 1, 2018, which claims the benefit of U.S. Provisional Application No. 62/566,677 filed Oct. 2, 2017, which is hereby incorporated by reference.

BACKGROUND

Recent technological improvements have dramatically improved the ability to communicate across vast distances. Extensive fiber optic and satellite networks now allow remote parts of the world to communicate with one another. However, by spanning across these great distances, such as across the Atlantic or Pacific Oceans, fiber optic cables can incur a round-trip latency or time lag of about 60 msec or more. Satellite communications can experience even greater lag times. In many cases, this high latency cannot be overcome because it is inherent in the communications medium and equipment. For example, light may traverse an optical fiber 30-40% more slowly than a radio wave traveling the same distance through free space. Fiber optic networks typically require multiple repeaters that further increase latency. While generally not problematic in a number of circumstances, this high latency can cause unacceptable delays in the execution of time sensitive activities, especially time sensitive activities that require complex logic and/or are dependent on conditions that rapidly change. These latency issues can for example create problems for a whole host of activities, such as in the operation and/or synchronization of distributed computer systems, scientific experiments with geographically large sensor arrays, and telemedicine/diagnostic activities, to name just a few. In one particular example, orders to buy and sell securities or other financial instruments in world markets typically rely on communications links that carry data and instructions over systems using fiber optic lines, coaxial cables, or microwave communication links. Any delays in executing an order, such as caused by the high latency across fiber optic lines, can lead to significant financial losses.

In order to send information across broad distances by radio communication, a radio signal may take advantage of skywave propagation where the signal "bounces" between the earth and the upper atmosphere to traverse long distances across the globe. This can advantageously result in communications traveling rapidly beyond line of sight. However, it can also mean that transmitted signals may never reach the intended receiving station because the signals may never return to earth at that specific location. Predicting the likelihood of a transmitted signal reaching a particular location on earth via skywave propagation can be a challenge given that skywave propagation is affected by multiple unrelated variables such as weather conditions, sunspot cycles, changes in solar radiation, the time of day, the desired transmission frequency, the type of antenna, the height of the antenna above the ground, and the topography of the ground around the transmission site.

SUMMARY

A unique communication system and method has been developed to address the above-mentioned latency issues as well as other issues. In the communication system, command data is transmitted so as to be received at a receiving station before (or at the same time) triggering data is received. The command data includes one or more directives, instructions, algorithms, and/or rules for controlling a machine, such as a computer and/or mechanical device, to take one or more actions. For example, the command data in one form includes a program for buying and/or selling particular options or stocks at certain price levels, ranges, and/or based on other conditions. Command data is typically (but not in all circumstances) larger in size than the triggering data such that the command data takes longer than the triggering data to transmit over communication links having the same data bandwidth. The triggering data includes information identifying one or more commands in the command data to execute. For example, the triggering data can identify one or more particular options in the command data that identifies the particular stock (or multiple stocks) to purchase at a particular price (or prices).

In one example, the command data is transmitted over a communication link that has high bandwidth and high latency, such as over a fiber optic cable, and the triggering data is transmitted over a communication link that has low bandwidth and low latency, such as through sky-wave propagation by refracting and/or scattering radio waves from the ionosphere. The relatively small-sized triggering data is then able to be more quickly received at a receiving station than if the triggering data was transmitted over the high bandwidth and high latency communication link provided by fiber optic cable. This communication system and method dramatically reduces the time to execute complex time-sensitive actions, such as financial transactions, over large distances at remote locations. In one form, this technique is used to remotely perform actions past the radio horizon, such as for transatlantic communications. This technique can be adapted for one-way type communications or even two-way type communications.

This unique communication system and method in one example uses multiple communications links. In one form, the communication links use different communications media. Such a system might be used, for example, to transmit a large collection of preprogrammed commands or rules over a high latency/high bandwidth link in advance of a triggering event which may be a market event, news report, a predetermined date and time, and the like. This set of rules or preprogrammed actions may be sent as a software update to an executable program, or as a firmware upgrade for a Field Programmable Gate Array (FPGA). When a triggering event occurs, triggering data can be sent over a low latency/low bandwidth link alone, or over both links, causing the preprogrammed commands to be executed as planned.

In one example of the system, the low latency/low bandwidth communications link uses radio waves to transmit data in concert with the higher latency/high bandwidth communications link which may be a packet switched network operating over fiber optic cables. Such a combination may include various combinations with widely varying differentials between the high and low latency links. The low latency link may use high frequency (HF) radio waves to transmit over a propagation path between North America and Europe. Radio waves may transmit, for example, with a one-way latency of 20 to 25 ms or less (40 to 50 ms round trip). A higher latency link may carry data over a different propagation path, or perhaps through a different medium between the same two continents that, for example, may have a latency of about 30 ms or more one-way, or 60 ms or more both ways.

The latency may be reduced and the reliability of the low latency/low bandwidth link may be improved by preparing the site of the transmitting antenna to optimize the number of hops along the propagation path, and/or increase the likelihood of the signal returning to earth at a receiving station or repeater. The site of the transmitting antenna may be chosen or modified according to manage the interaction of the transmitted electromagnetic energy with the antenna and the ground for the given range of desirable transmission frequencies.

For example, modifications to the ground elevation at the antenna transmission site may include placing the antenna at the top of a natural landform such as a hill or above a valley. The ground elevation could further be modified by adding or removing soil in the area around the antenna. In this way, the interaction between the radio waves and the ground may be controlled to cause radio waves to be transmitted at a given angle relative to the earth. Choosing this angle may then reliably control the skip distance and the number of hops between the transmitting antenna in the receiving antenna for a desired range of frequencies and time of day.

Other variations of site preparation may include positioning the transmitting antenna near a body of water such as an ocean, a saltmarsh or other brackish water. In one configuration, the antenna would float on a device such as a barge, buoy or raft. In another configuration, pylons or towers would be constructed in the body of water in order to elevate the antenna above the surface of the water. In another variation, the height of the antenna is adjustable (i.e., may be raised or lowered) so as to compensate for changing conditions, or switching between different transmission frequencies.

In another aspect, overall security of the system may be enhanced by sending a continual stream of actions and/or triggering messages over the separate communications links to confuse malicious third parties and discourage attempts to intercept and decipher future transmissions. These messages may be very short, or intermingled with various other transmissions which may go on continuously, or for only short periods of time on a predetermined schedule. In a related aspect, security may be enhanced by sending short messages over skywave propagation on one or more frequencies, or by sending small parts of a message on several frequencies at the same time. Various additional techniques may also be employed to enhance security such as encryption, two-way hashing, and the like, which may incur additional latency in both links.

So as to aid in appreciating the unique features of this communication system and method, the communication system and method will be described with reference to executing trades of stocks, bonds, futures, or other financial instruments, but it should be recognized that this system and method can be used in a large number of other fields where latency is a concern, such as for distributed computing, scientific analysis, telemedicine, military operations, etc.

Further forms, objects, features, aspects, benefits, advantages, and embodiments of the present invention will become apparent from a detailed description and drawings provided herewith.

BRIEF DESCRIPTION OF THE DRAWINGS

FIG. 11 is a signal strength plot for a transmitting antenna of the system of FIG. 1 situated on downward sloping ground that terminates in a body of water.

DETAILED DESCRIPTION

Figure 1:
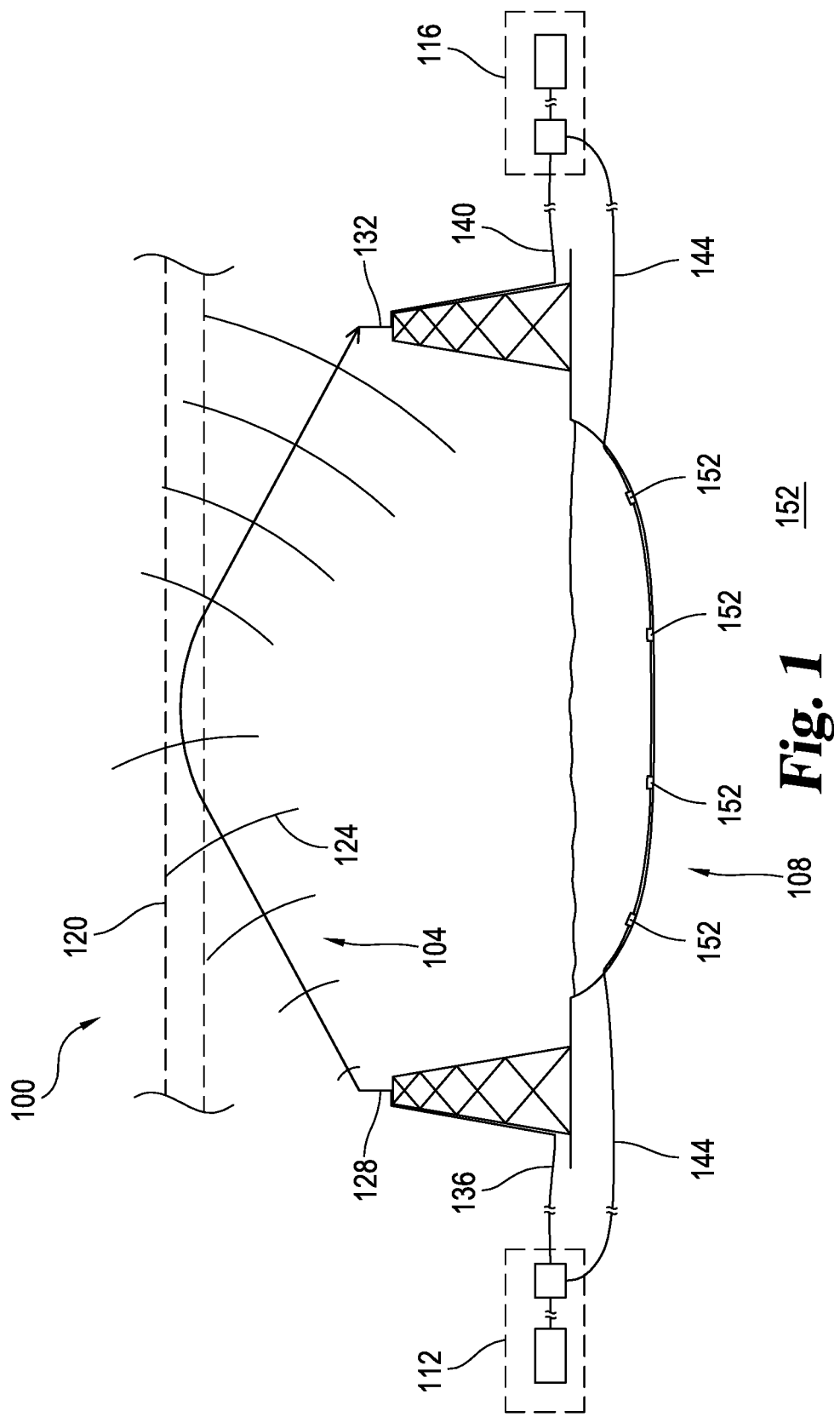
FIG. 1 is a schematic diagram of a system for transmitting data over separate communication links, one of which uses skywave propagation.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates at 100 one example of a system configured to transfer data via a low latency, low bandwidth communication link 104, and separate data via a high latency, high bandwidth communication link 108. Communication links 104 and 108 provide separate connections between a first communication node 112 and a second communication node 116. Low latency connection 104 may be configured to transmit data using electromagnetic waves 124 passing through free space via skywave propagation. Electromagnetic waves 124 may be generated by a transmitter in first communication node 112, passed along a transmission line 136 to an antenna 128. Waves 124 may be radiated by antenna 128 encountering an ionized portion of the atmosphere 120. This radiated electromagnetic energy may then be refracted by the ionized portion of the atmosphere 120 causing waves 124 to redirect toward earth. Waves 124 may be received by a receiving antenna 132 coupled to second communications node 116 by transmission line 140. As illustrated in FIG. 1, a transmitting communication node may use skywave propagation to transmit electromagnetic energy long distances across the earth surface without the need of one or more transmission lines to carry the electromagnetic energy.

Data may also be transmitted between communications nodes 112 and 116 using a high latency communication link 108. As illustrated in FIG. 1, high latency communication link 108 may be implemented using a transmission line 144 passing through the earth, which may include passing under or through an ocean or other body of water. As shown in FIG. 1, the high latency communication link may include repeaters 152. FIG. 1 illustrates four repeaters 152 along transmission line 144 although any suitable number of repeaters 152 may be used. Transmission line 144 may also have no repeaters at all. Although FIG. 1 illustrates communication link 104 transmitting information from first communication node 112 to second communication node 116, the data transmitted may pass along communication links 104, 108 in the both directions.

Figure 2:
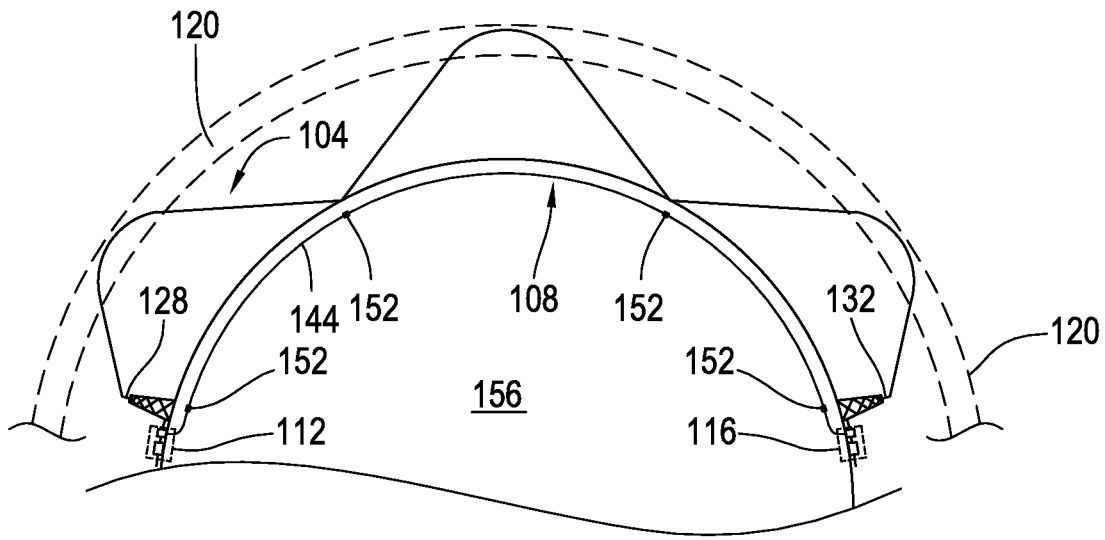
FIG. 2 is a schematic diagram further illustrating the skywave propagation of FIG. 1

The configuration shown in FIG. 1 is further illustrated in FIG. 2 where first communication node 112 and second communication node 116 are geographically remote from one another separated by a substantial portion of the surface of the earth (156). This portion of the earth's surface may include one or more continents, oceans, mountain ranges, or other geographic areas. For example, the distance spanned in FIGS. 1-7 may cover a single continent, multiple continents, an ocean, and the like. In one example, node 112 is in Chicago, Ill. in the United States of America, and node 116 is in London, England, in the United Kingdom. In another example, node 112 is in New York City, N.Y., and node 116 is in Los Angeles, Calif., both cities being in North America. Any suitable combination of distance, communication nodes, and communications links is envisioned that can provide satisfactory latency and bandwidth.

FIG. 2 generally illustrates how skywave propagation facilitates passing electromagnetic energy across long distances. Using skywave propagation, low latency communication link 104 transmits electromagnetic waves 124 into a portion of the atmosphere 120 that is sufficiently ionized to refract electromagnetic waves 124 toward the earth. The waves may then be reflected by the surface of the earth and returned to the ionized portion of the upper atmosphere 120 where they may be refracted toward earth again. Thus electromagnetic energy may "skip" repeatedly allowing the low latency, low bandwidth signals 124 to cover distances substantially greater than those which may be covered by line-of-site or other non-skywave propagation.

Figure 3:
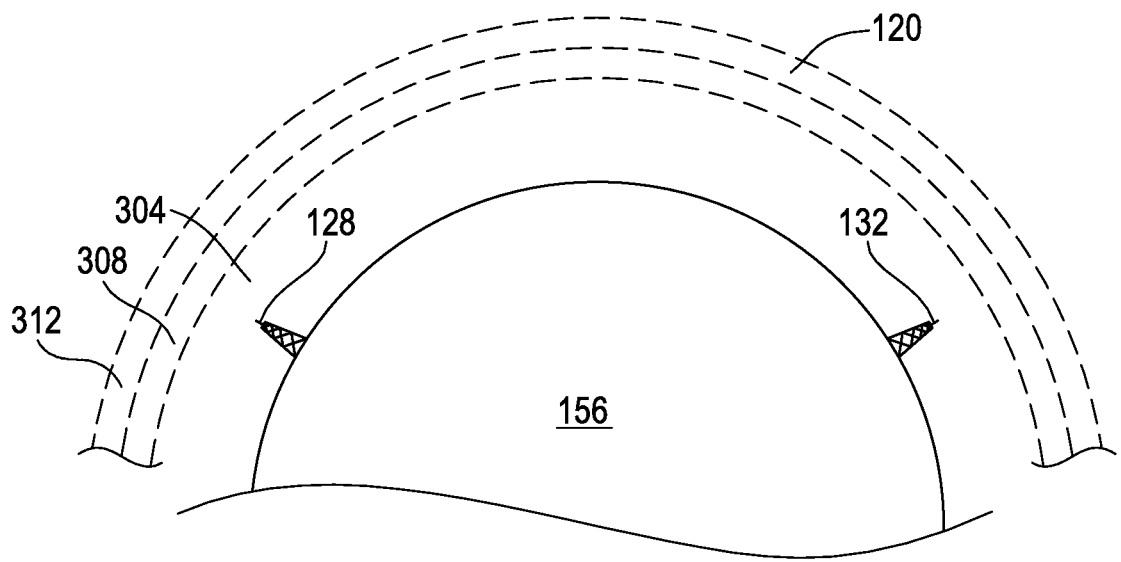
FIG. 3 is a schematic diagram illustrating additional layers of the atmosphere including the ionized layer shown in FIG. 1.

Additional details regarding skywave propagation are illustrated in FIGS. 3-6. The relation to the disclosed system and various layers of the upper atmosphere is illustrated in FIG. 3. For purposes of radio transmission, the layers of the upper atmosphere may be divided as shown into successively higher layers such as the troposphere 304, the stratosphere 308, and the ionosphere 312.

The ionosphere is named as such because it includes a high concentration of ionized particles. The density of these particles in the ionosphere furthest from earth is very low and becomes progressively higher in the areas of the ionosphere closer to earth. The upper region of the ionosphere is energized by powerful electromagnetic radiation from the sun which includes high-energy ultraviolet radiation. This solar radiation causes ionization of the air into free electrons, positive ions, and negative ions. Even though the density of the air molecules in the upper ionosphere is low, the radiation particles from space are of such high energy that they cause extensive ionization of the relatively few air molecules that are present. The ionization extends down through the ionosphere with diminishing intensity as air becomes denser with the highest degree of ionization thus occurring at the upper extremities of the ionosphere, while the lowest degree occurs in the lower portion of the ionosphere.

Figure 4:
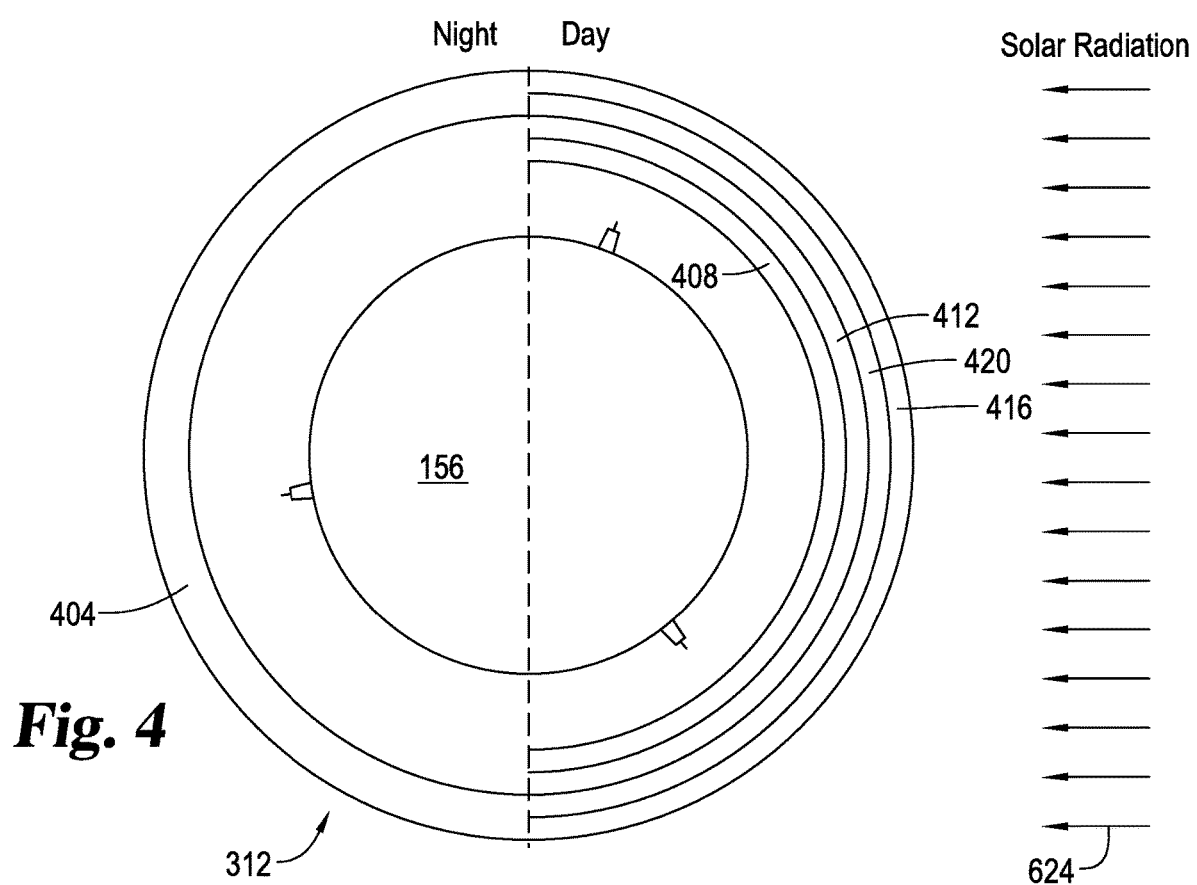
FIG. 4 is a schematic diagram illustrating various ionized layers of the atmosphere shown in FIG. 5.

These differences in ionization between the upper and lower extremities of the ionosphere 312 are further illustrated in FIG. 4. The ionosphere is illustrated in FIG. 4 with three layers designated, respectively, from lowest level to highest level as D layer 408, E layer 412, and F layer 404. The F layer 404 may be further divided into two layers designated F1 (the higher layer) at 416 and F2 (the lower layer) at 420. The presence or absence of layers 416 and 420 in the ionosphere and their height above the earth vary with the position of the sun. At high noon, radiation from the sun 424 passing into the ionosphere is greatest, tapering off at sunset and at a minimum at night. When the radiation is removed, many of the ions recombine causing the D layer 408 and the E layer 412 to disappear, and further causing the F1 and F2 layers 416, 420 to recombine into a single F layer 404 during the night. Since the position of the sun varies with respect to a given point on earth, the exact characteristics of layers 408, 412, 416, and 420 of ionosphere 312 can be extremely difficult to predict but may be determined by experimentation.

The ability for a radio wave to reach a remote location using skywave propagation depends on various many factors including the ion density in layers 408-420 (when they are present), transmission frequency, propagation angle, type of antenna, polarization of the transmitted waves, and weather conditions, to name a few nonlimiting examples. For example, if the frequency of a radio wave is gradually increased, a point will be reached where the wave cannot be refracted by D layer 408 which is the least ionized layer of ionosphere 312. The wave may continue through the D layer 408 and into the E layer 412 where its frequency may still be too great to refract the singles passing through this layer as well. The waves 124 may continue to the F2 layer 420 and possibly into the F1 layer 416 as well before they are bent toward earth. In some cases, the frequency may be above a critical frequency making it impossible for any refraction to occur causing the electromagnetic energy to be radiated out of the earth's atmosphere.

Figure 5:
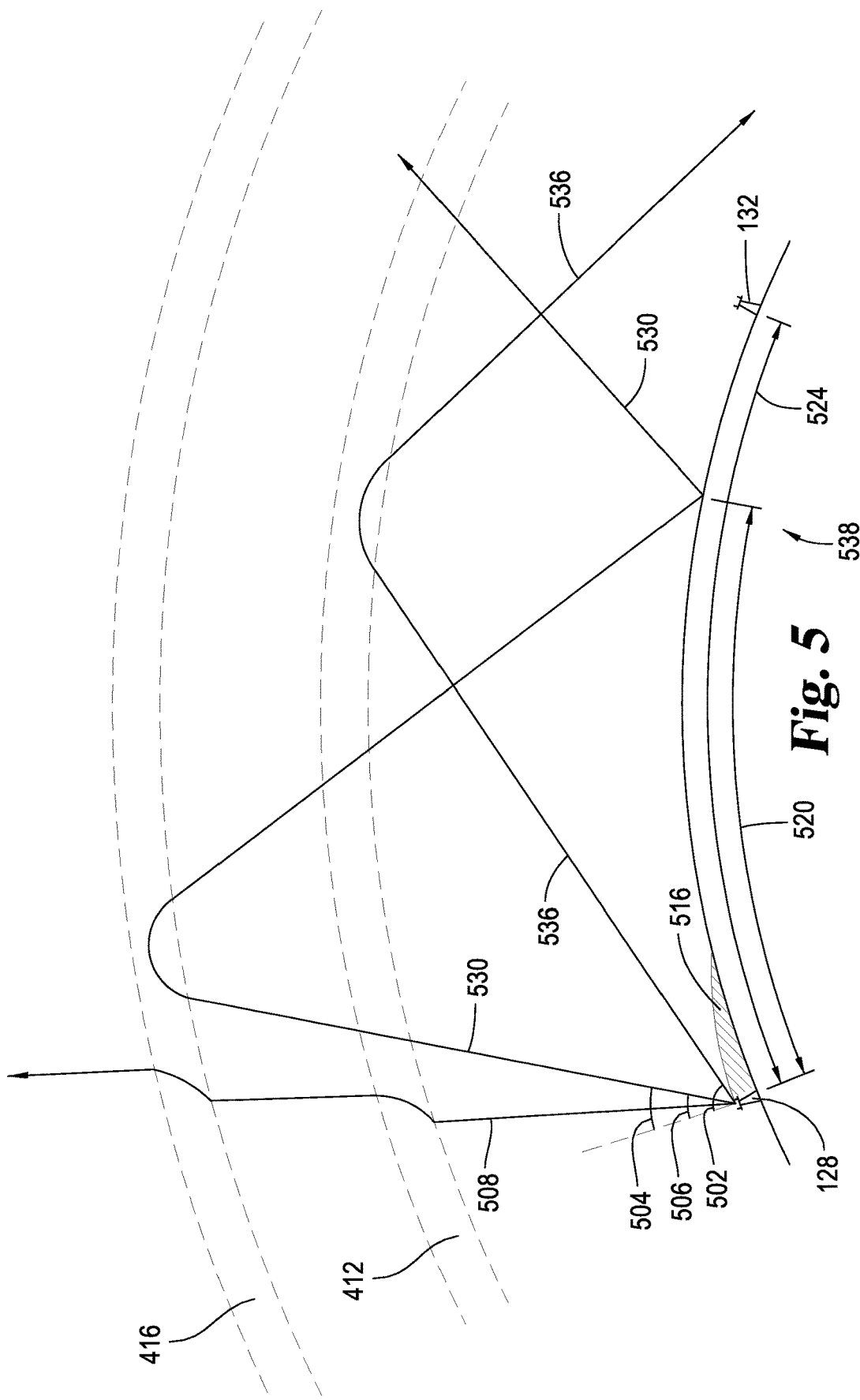
FIG. 5 is a schematic diagram illustrating ineffective skywave propagation in the system in the context of the system of FIG. 1.

Some examples of propagation where the transmitted signal fails to reach the remote intended receiver 132 are illustrated in FIG. 5. These examples generally include signals 508 transmitted above the critical frequency for the current conditions, and which thus pass into outer space without undergoing any skipping action, signals 516 which are only transmitted within the line of sight of antenna 128, signals 530 that return to earth between the transmitter and receiver, and signals 536 which skip over the intended receiving station and return to earth some distance beyond the intended receiver.

In FIG. 5, the angle of propagation in the broadcast frequency may be changed to optimize the transmission of electromagnetic waves transmitted by antenna 128 so that they may be refracted toward Earth's surface with a skip distance that matches the distance 524 between the transmitting antenna and the remote antenna 132, or alternatively, with multiple skip distances that together result in the signal reaching a receiving antenna at the distance 524. As atmospheric conditions change, the condition of the ionosphere changes, transmitting frequency changes, or the angle propagation changes, the skip distance can shorten or lengthen causing signals sent from transmitting antenna 128 to not be received at remote antenna 132.

For example is shown in FIG. 5, signals 508 are transmitted from antenna 128 with an angle of propagation 504 passing through multiple layers of the ionosphere such as the D layer 408, and the F1 layer 416. In this example signals 508 are transmitted at a frequency that exceeds the critical frequency at the angle of propagation 504 thus causing signals 508 to be radiated into outer space without reaching remote antenna 132.

In another example, electromagnetic energy 530 is transmitted from transmitting antenna 128 at a propagation angle 506. Signals 530 may pass through lower layers of the ionosphere such as the D and E layers starting at 408 to be later refracted by a higher layer of the ionosphere such as the F1 layer 416. The signal 530 is bent back towards earth, where it is reflected by the Earth's surface at 538 some distance 520 away from the transmitting antenna. Signal 530 then returns skyward from location 538 without being intercepted and received by antenna 132. Thus skip distance 520, or multiples thereof, does not approximately or exactly coincide with distance 524 between transmitting station 120 and receiving station 132. Put another way, distance 524 is not evenly divisible by distance 520 and therefore, signals 530 may never reach the surface of the earth at or near receiving antenna 132 regardless of the number of hops involved. It may be possible for signal 530 to reach antenna 132 by skipping between the surface and the ionosphere repeatedly to make one or more trips around the earth, and may then be eventually received by receiving station 132. These extra hops result in reduced signal strength when they are finally received, and the time required to traverse the globe further adds to the transmission latency between transmitter and receiver. As illustrated, receiving station 132 would likely only faintly receive signals 530 if it receives the signals at all.

In another example, electromagnetic energy 536 transmitted by antenna 128 leaves the antenna array with a propagation angle 502 that is closer to the horizon than 504 or 506. In this example, signal 536 is refracted by a lower layer 412 of the ionosphere such as the E layer, but because the propagation angle 502 is closer to the horizontal, the skip distance for signal 536 exceeds the distance 524 between transmission location 128 and receiving location 132. As with signal 530, signal 536 may be received the antenna 132 after one or more trips around the earth, but the signal is likely to be much weaker if received at all, and would involve a significant increase in transmission time.

Figure 6:
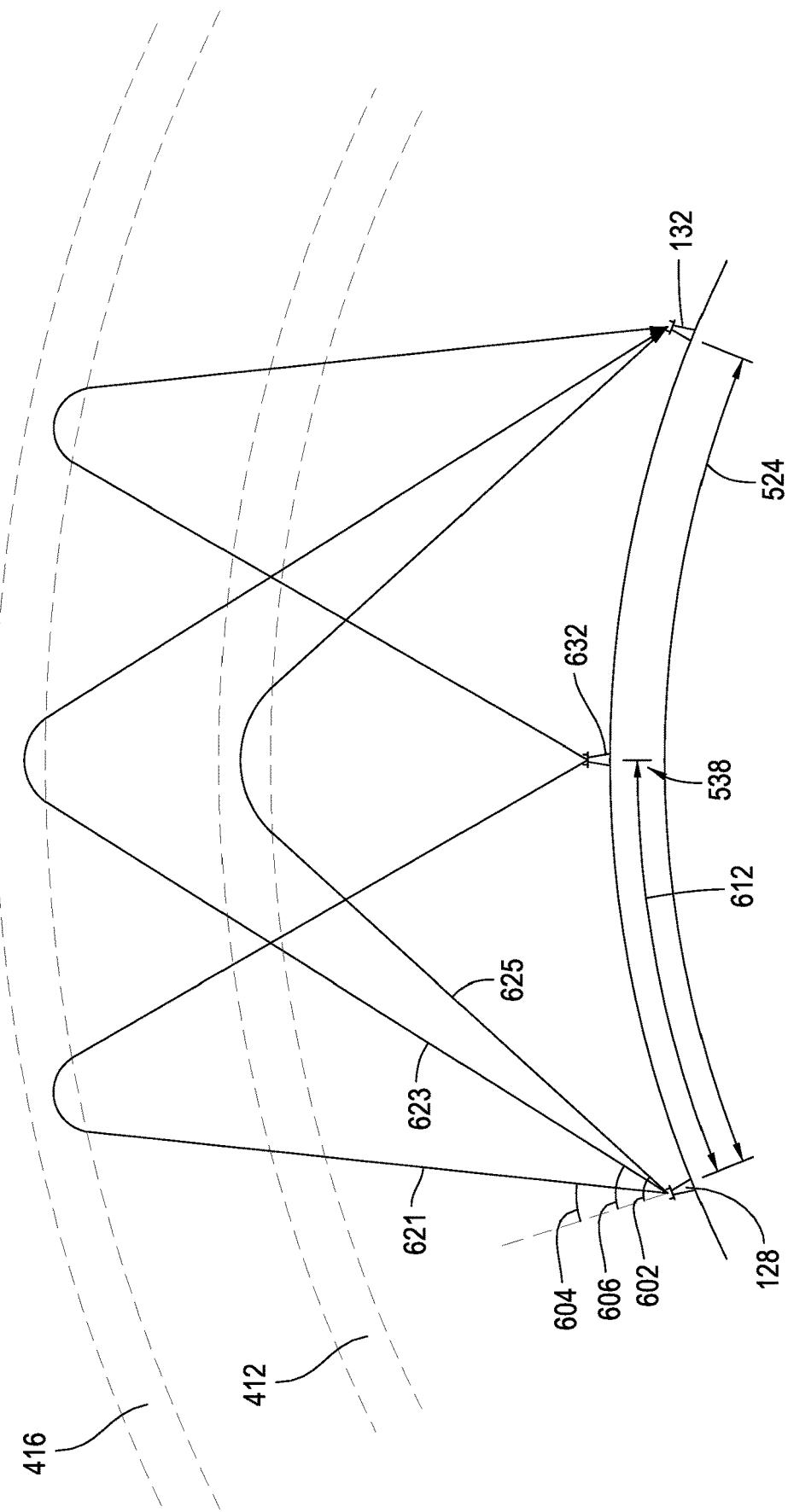
FIG. 6 is a schematic diagram illustrating effective skywave propagation in the system in the context of the system of FIG. 1.

FIG. 6 illustrates examples of signals 615, 623, and 625 with skip distances that coincide with distance 524 between transmitting antenna 128 and receiving antenna 132. In these examples, changes in the ionization properties of the atmosphere, changes to the angle of propagation, changes to the transmission frequency, or changes in other related aspects result in successful skywave propagation optimized to relay electromagnetic energy from a transmitting antenna 128 receiving antenna 132 with a maximum possible signal strength in the shortest time (e.g. without making a trip around the earth first). In one example, signals 621 are transmitted at a propagation angle 604 from transmitting antenna 128. Signals 621 are reflected by an upper-level of the ionosphere 416 (e.g. the F1 layer), causing them to be refracted back towards Earth where they are reflected back again toward the ionosphere at location 638. Location 638 coincides in this example at approximately the halfway point between transmitting and receiving antennas 128 and 132 thus allowing signals 621 to traverse the distance 524 in two hops. The repeater 632 may optionally be located at 638 to receive signals 621 and retransmit them according to the principles disclosed herein.

In another example, signals 623 are transmitted by transmitting antenna 128 at a propagation angle 606 that is greater than propagation angle 604 (i.e. having a "takeoff angle" closer to the horizontal). In this example, the frequency of signals 623 and the propagation angle 606 coincide with ionization properties of the upper atmosphere and other variables causing signals 623 to be refracted off an upper layer of the ionosphere such as the F1 layer 416. Signals 623 return towards Earth where they reach the ground at about the same location as receiving antenna 132. In this example, conditions, frequency, and propagation angle (and any other relevant variables), coincide to allow signals 623 to traverse distance 524 in a single hop.

FIG. 6 illustrates a third example where signals 625 are transmitted at an even greater propagation angle from the vertical 602 (i.e. closer to the horizontal than angle 606). In this example, signals 625 are refracted from a lower level of the ionosphere such as the E level 412, thus traversing distance 524 in a single hop. Examples signals 623, and 625, may provide a faster relay time (i.e. lower transmission latency) by virtue of traversing distance 524 in a single hop rather than multiple hops is shown for signals 621. Optimizing communications link that uses skywave propagation to traverse the skip distance in a single hop is thus a function of a number of variables, one of which is the angle of propagation. Increasing the angle of propagation, or put another way, decreasing the "take off angle" relative to the earth may have the effect of lengthening the range of the initial skip distance. The angle of propagation depends on a number of variables including type of antenna, height of antenna above the ground, the type of terrain surrounding the transmitting antenna 128, and others.

The terrain in the area of a transmitting antenna such as antenna 128 has a significant effect on the behavior of the antenna and the resulting pattern of electromagnetic radiation. This is caused, at least in part, by the fact that waves radiated from the antenna toward the ground near the antenna reflect into space, and back toward the antenna. The reflected signals therefore have slightly further to travel than the transmitted signals causing areas of constructive and destructive interference between the transmitted and reflected waves as the waves spread outwardly into space. In the area near the antenna, the reflected waves passing the antenna induce a voltage in it. The magnitude and phase of the current resulting from this induced voltage depends on factors such as the type of ground surface, it's conductive or resistive properties, and the height of the antenna above the reflecting surface to name a few nonlimiting examples.

The total current in the antenna at any given time therefore consists of at least two primary components. The amplitude of the first, or "transmission" component is determined by the power supplied by the transmitter and the resistance of the antenna as measured at the feed point. The second or "reflected" component of the current in the antenna is induced by the transmitted wave that is reflected from the ground. This second "reflected" component of current, while often considerably smaller than the first at most antenna heights, plays a significant role in changing the behavior of the antenna. At some heights above the ground, the peaks and valleys of the transmitted and reflected waves will coincide in time, (i.e. be "in phase", or "constructively interfere"), so that the total current is larger than what would be expected given the feed point resistance of the antenna. At other heights, the transmitted and reflected wave components are somewhat out of phase (i.e. at least partially destructively interfering with each other), and the total current in the antenna is the difference between these two components.

This phenomenon can degrade the performance of an antenna, or can be accounted for in optimizing antenna for a particular transmission site. For example, changing the height of the antenna above ground will change the amount of current flow in the antenna, (assuming that the power input to the antenna is constant). Installing a ground counterpoise of highly reflective material such as a metal mesh, or a series of wires buried in the ground around the base of the antenna and extending outwardly in multiple directions can also improve the antenna's behavior. A higher current at the same power input means that the effective resistance of the antenna is lower, while a lower current means the "reflected" component is having a greater effect on the overall current making the effective impedance of the antenna higher. In other words, the impedance of the antenna is affected by variables which include the height of the antenna above ground and the type of material in the ground because of mutual coupling between the antenna and the ground beneath it. Thus it is possible for the same antenna at the same height to have different impedance values depending on the local topography and type of ground (e.g. sand, clay, farmland, mountains, salt marshes, lakes, etc.)

Topography near the antenna can also affect the antenna's electromagnetic activity far away from the antenna. As noted above, electromagnetic waves reflected off the ground travel slightly further than the "directly transmitted" waves that are not reflected. The reflected waves can constructively interfere with the directly transmitted waves farther away from the antenna to create areas of concentrated radiated electromagnetic energy, or "lobes." Conversely, transmitted and reflected waves can partially or completely destructively interfere with one another to reduce the intensity of electromagnetic radiation in other areas, areas referred to as "nulls".

Figure 7:
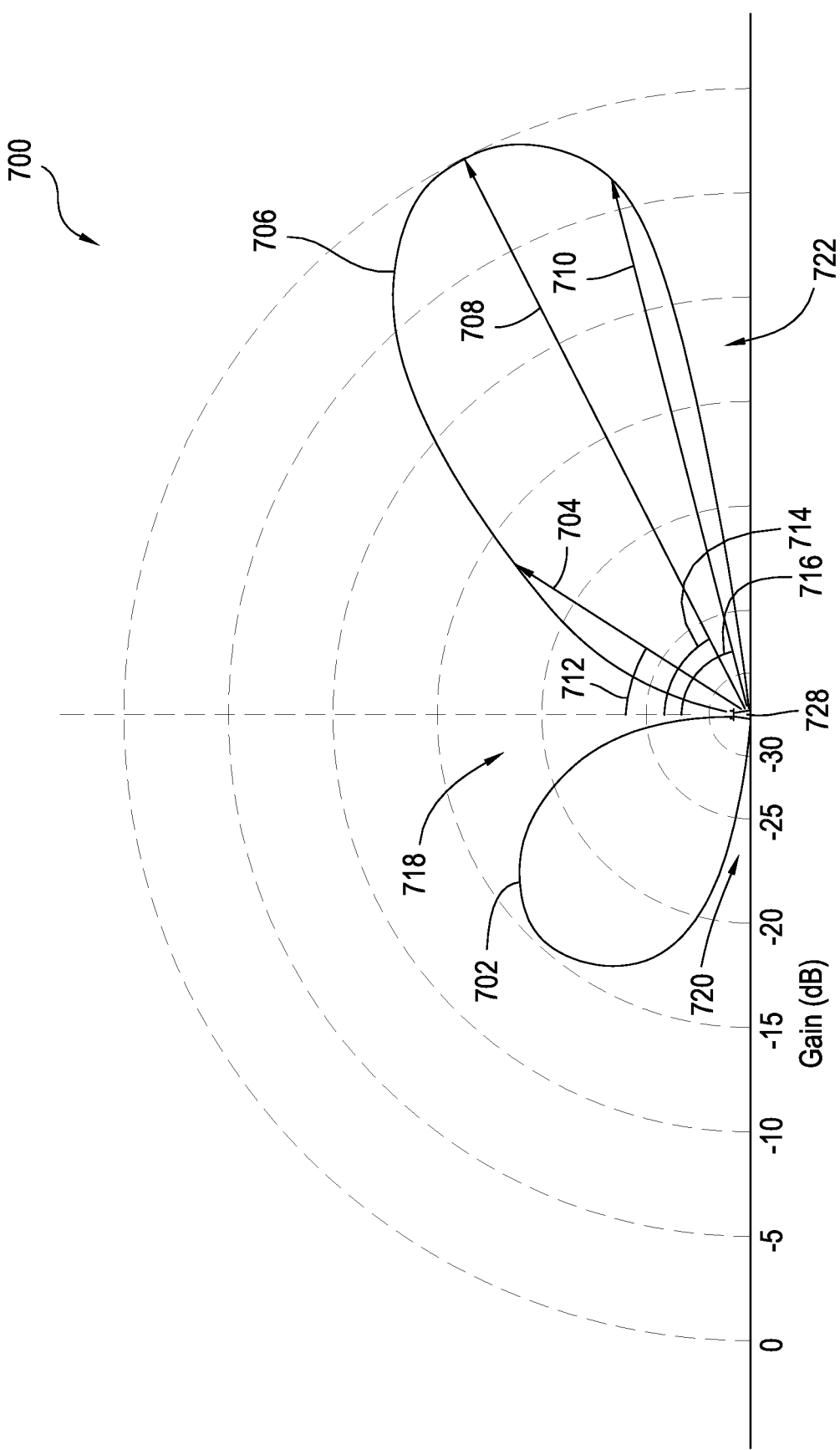
FIG. 7 is a signal strength plot for a transmitting antenna of the system of FIG. 1 situated on generally level ground.

Examples of this phenomenon are shown at 700 in FIG. 7. Lobes 702 and 706 radiate up and away from transmitting antenna 128, while a null 718 forms directly above antenna, and nulls 720, and 722 appear close to the ground around the antenna. In this example, antenna 128 is configured with radiating elements directing electromagnetic energy in the direction of lobe 706 with greater field strength then in the direction of lobe 702. Thus lobe 706 may be referred to as the "front" of antenna 128, while lobe 702 may be referred to as radiating from the "back" of antenna 128. Antenna 128 as shown here is said to have larger "gain" or signal concentration in the direction of lobe 706 than in the direction of lobe 702.

At some elevation angles above the horizon, the direct and reflected waves are exactly in phase—that is, the maximum field strengths of both waves are reached at the same time at the same point in space, and the directions of the fields are the same. This phenomenon is illustrated in FIG. 7 at 708 where transmitted and reflected signals coincide to produce a maximum signal strength in the forward lobe 706. In this case, the transmitted waves are at their maximum signal strength at an angle of propagation 714.

At other propagation angles 712 and 716, the transmitted and reflected waves are somewhat out of phase thus causing destructive interference and reduced signal strength in the direction 704 and 710 respectively. In other cases, the field intensities of the reflected and transmitted waves are equal at the same instant and the directions are opposite. This causes nulls at 720, 718, and 722. Reflected waves undergo a change in both amplitude and phase. At a low takeoff angle (propagation angle near 90 degrees), the phase of the reflected wave changes by 180 degrees and it destructively interferes with the transmitted wave. For example, at a zero takeoff angle, the reflected wave is almost equal in amplitude, but 180 degrees out of phase with the directly transmitted wave. This results in complete or almost complete destructive interference and cancellation of the transmitted waves creating nulls 720 and 722. This means little if any electromagnetic radiation is transmitted from antenna 128 at a propagation angle of 90 degrees (i.e. 0 degree takeoff angle). Signals transmitted in these angles closer to the vertical or closer to the horizontal are totally cancelled out by the reflective properties of the ground as discussed above. Thus, FIG. 7 illustrates that the ground increases the concentration of electromagnetic radiation at some elevation angles, and decreases it at others for a given frequency and antenna height.

Figure 8:
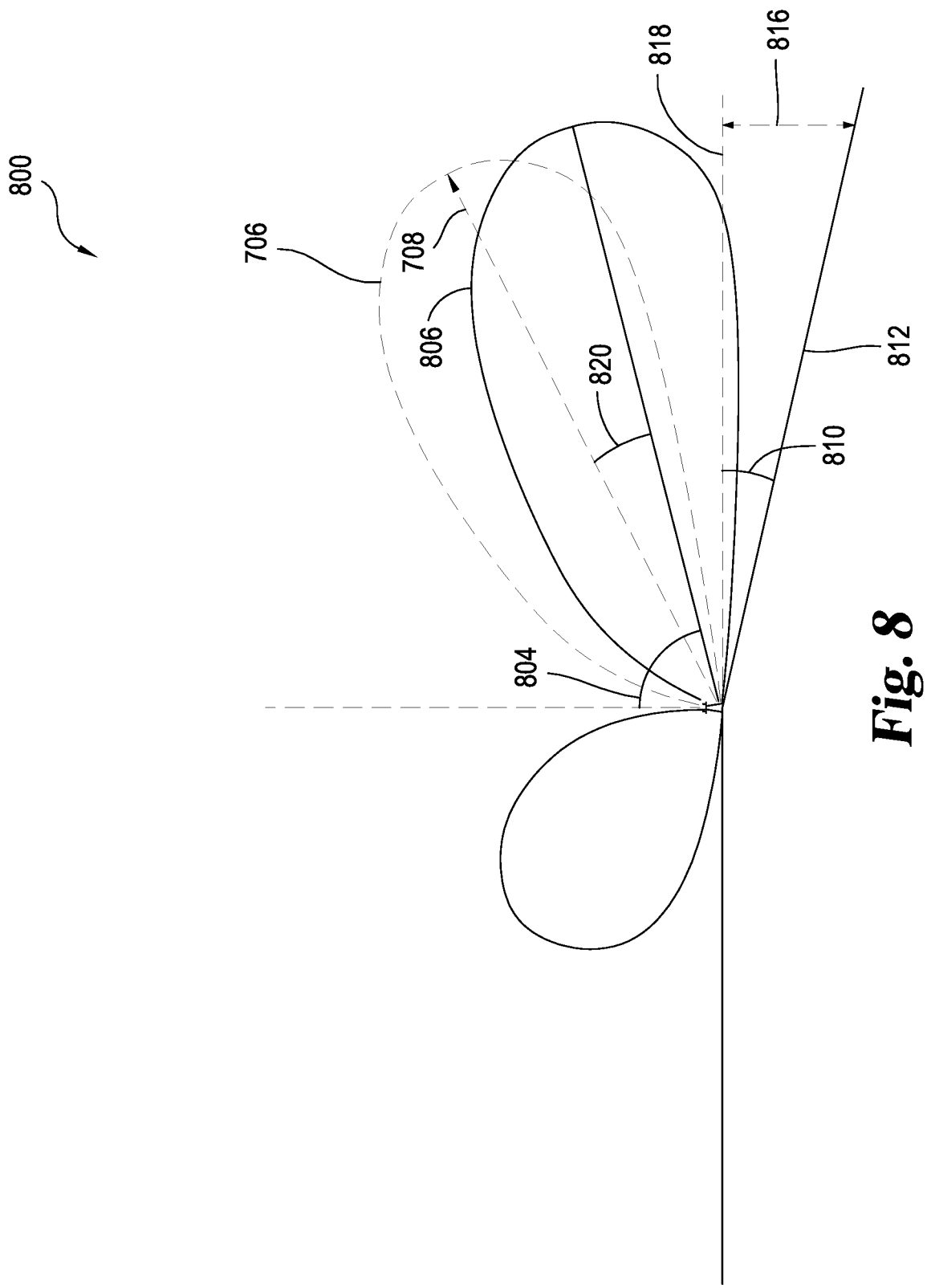
FIG. 8 is a signal strength plot for a transmitting antenna of the system of FIG. 1 situated on downward sloping ground.

This phenomenon of interference between the transmitted and reflected waves in relation to the ground may be accounted for and used to prepare a site for an antenna such as the one shown at 800 in FIG. 8. In FIG. 8, a transmitting antenna 802 which is like the transmitting antenna 128 in the preceding figures, is positioned at or near the summit of a long, continuous downslope 812 that extends downwardly in the direction of the receiving antenna at a predetermined angle of declination 810 relative to the horizontal beginning at or near the base of antenna 802. The terrain falls by a predetermined number of feet 816 over a predetermined range 818 from antenna 802. Compared to a similarly situated antenna on relatively flat smooth ground illustrated in FIG. 7, the propagation angle 804 of maximum radiated electromagnetic energy intensity is shifted closer to the horizontal by an angle 820 that may correspond roughly to the angle of declination 810. In one example, the sloping ground falls about 150 feet in height over a range of about 3000 feet from the base of antenna 802 resulting in an angle of declination of about 3 degrees. This has the effect of changing the distance to the first hop (location 638) in skywave communication as illustrated in FIGS. 5 and 6.

Figure 10:
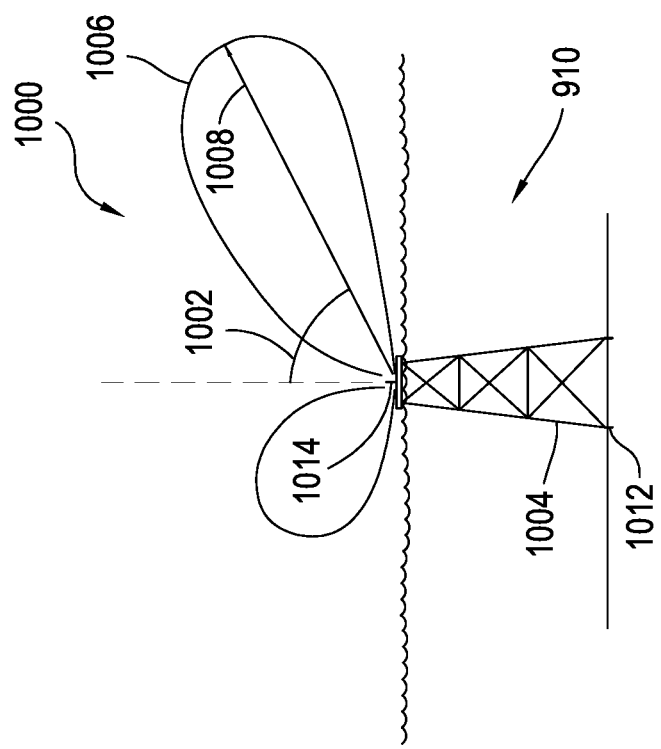
FIG. 10 is a schematic representation of an antenna of the system of FIG. 1 fixed to a structure surrounded by a body of water.
Figure 9:
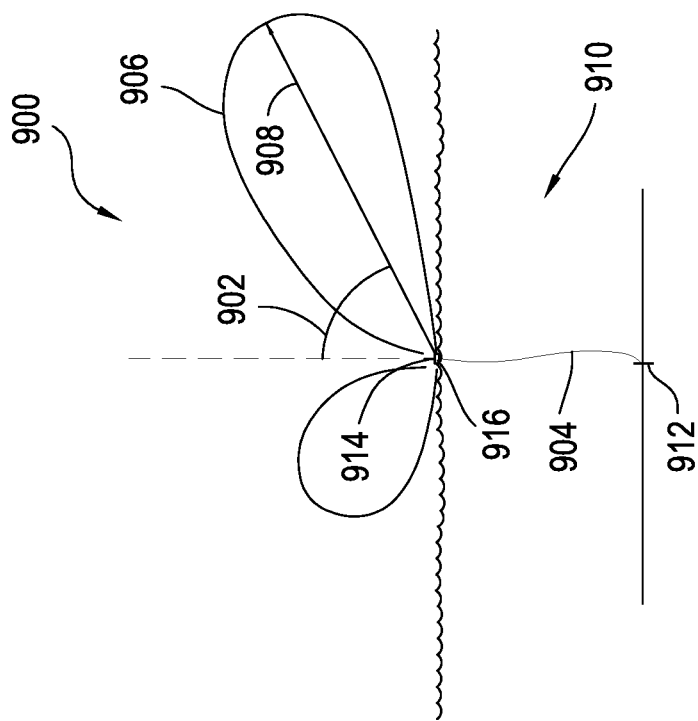
FIG. 9 is a schematic representation of an antenna of the system of FIG. 1 floating in a body of water.

FIGS. 9-11 illustrate other concepts that may be employed in optimizing skywave communications by preparing topography around an antenna's location. These concepts may be used in conjunction with those presented herein elsewhere. For example FIG. 9 illustrates at 900 another example of an antenna 914 similar to antenna 128 positioned in the body of water 910 and is surrounded by it. This body of water may be selected because it includes certain specific impurities which may change the reflective properties of the site. For example, the body of water 910 may be the ocean which may include salt and other impurities which give it a salinity of about 35 parts per thousand. Other similar bodies of water may have a salinity of between about 30 parts per thousand and about 40 parts per thousand, while other cases the salinity of the body of water may advantageously be between five parts per thousand and 450 parts per thousand. In other examples, salinity may equal or exceed 450 parts per thousand. These properties may serve to change the propagation angle 902 to maximize forward electromagnetic radiation at 908 creating a lobe 906 that is optimized to transmit electromagnetic radiation by skywave propagation with a given frequency with skip zones of a predetermined length corresponding to the location of a receiving antenna at a repeater or at the final destination. Antenna 914 may be mounted to a flotation device 916 that maintains its general position in the body of water using a tether 904 the couples the flotation device to an anchor 912 anchored to the bottom of the body of water.

In another example shown at 1000 in FIG. 10, an antenna 1014 similar to antenna 128 is located on a tower 1004 anchored to the bottom of the body of water 910 by anchors 1012. In this example, a propagation angle 1002 similar to angle 902 results in a forward lobe 1006 in the direction 1008. This forward lobe may be optimized to transmit electromagnetic energy you skywave propagation such that it reaches a predetermined distance receiving antenna in a predetermined number of hops. Such optimization may occur because of the enhanced reflective properties of body water 910 relative to the height of the antenna, transmission frequency and other related factors. This can result in angles of propagation that are advantageous to reach a receiving antenna with a predetermined number of hops.

In another example at 1100 in FIG. 11, an antenna 1114 similar to antenna 128 is located at or near the top of a downward slope 1104 which is like the slope shown in FIG. 8. In this example, the reflective properties of the ground and topography around the antenna site may be improved by the downward slope terminating in a body of water 1110 which may be like body of water 910 with certain impurities such as salt to enhance the reflective properties of the antenna site. Thus a propagation angle of 102 may be achieved with the forward lobe 1106 in the direction 1108 that is optimized to transmit electromagnetic energy via skywave propagation such that a remote receiving antenna is positioned at a location where the reflected waves reach the ground.

In any of the previous examples, the transmitting antenna may be positioned on a tower that is operable to raise and lower the height of the antenna thus changing the constructive and destructive interference patterns at a given frequency that are caused by the surrounding topography. Raising and lowering the antenna may have positive effect of reducing the takeoff angle of the greatest concentration of electromagnetic energy in the forward direction.

Figure 12:
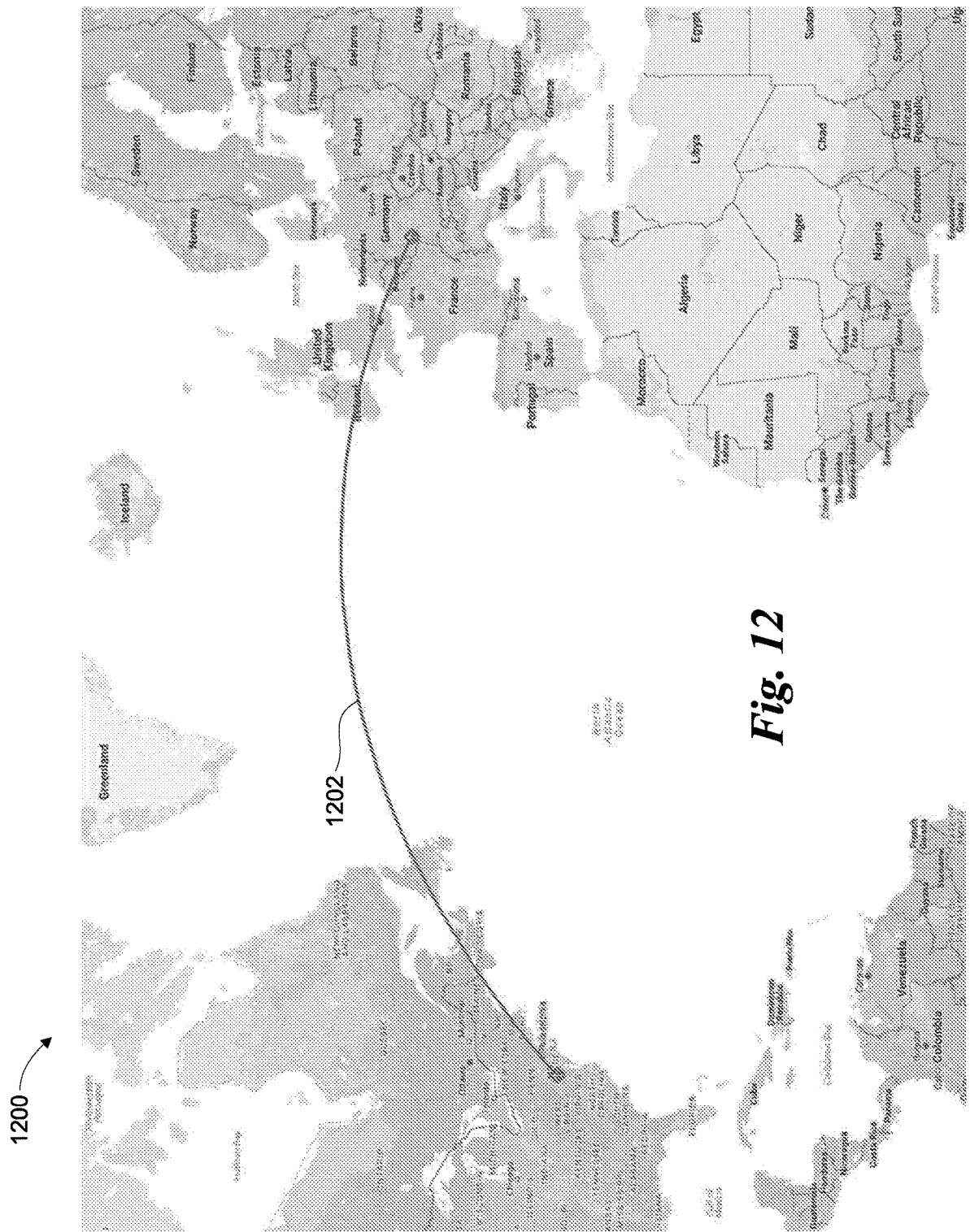
FIG. 12 is a map plot illustrating one example of a geodesic line between a transmitter and receiver like those shown in the preceding figures.

Optimizing skywave propagation also includes directing the forward lobe of radiated energy toward the receiving antenna so that the overall distance between the transmitter and receiver is minimized. For example, transmitting antenna 128, and the terrain around it, may be arranged to direct forward lobes such as lobe 706 in the direction of a "geodesic" or "great circle" path across the globe. Such a path between the east cost of the United States, and Europe is illustrated in FIG. 12 at 1200. Path 1202 is an example of such a geodesic line. Any suitable path may be chosen so as to minimize the distance between the transmitter and receiver. A closer view of path 1202 at the east coast of the United States appears in FIG. 13. Placing a transmitter or receiver close to, or on this line, and according to other aspects disclosed herein may provide advantages over other sites. A closer view of the path 1202 as it crosses the continent of Europe appears in FIG. 14. In choosing locations along this line, it may also be advantageous to position transmitting or receiving antennas close to the shortest path 1202, and that also have a short wire length to a nearby metropolitan area such as New York, London, Brussels, Frankfurt and the like. In another aspect, it may be advantageous to reduce the wire length to a particular location such as a financial exchange, telecommunications hub, manufacturing or business park, and the like. The shortened skyway propagation and shortened wire length can thus optimize either the wireless communication link, the fiber optic or wired communication links, or both.

Figure 15:
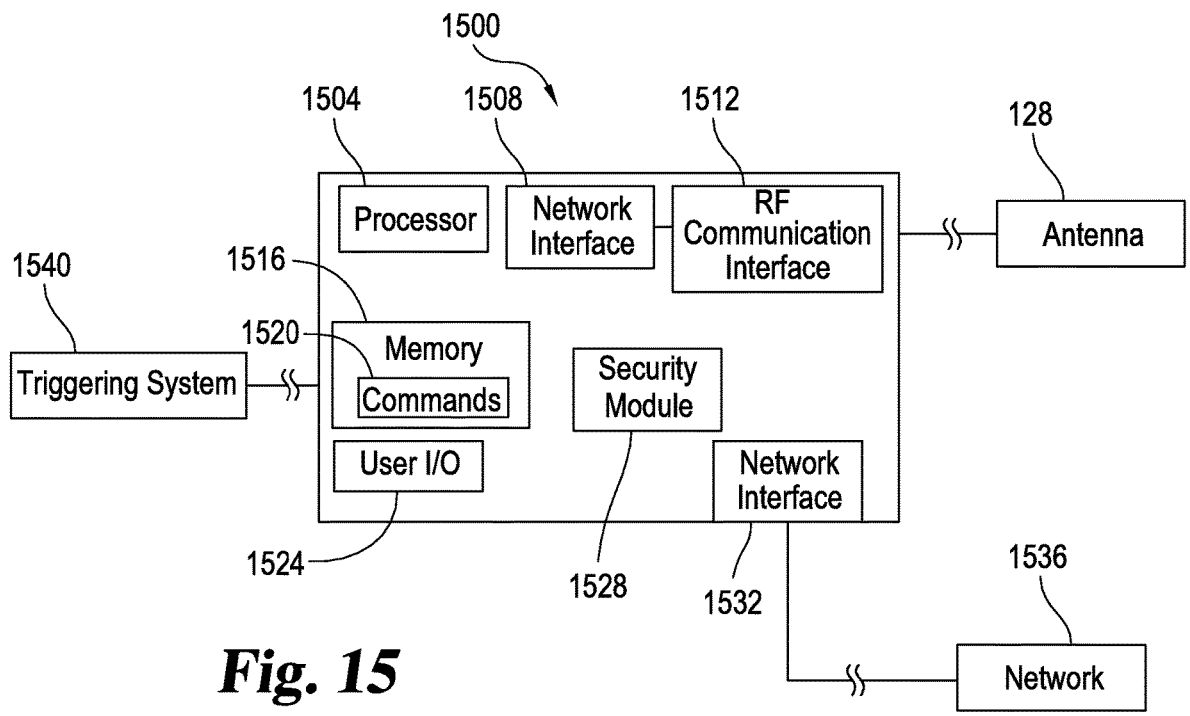
FIG. 15 is a schematic diagram illustrating additional detail for the communication nodes of FIG. 1.
Figure 16:
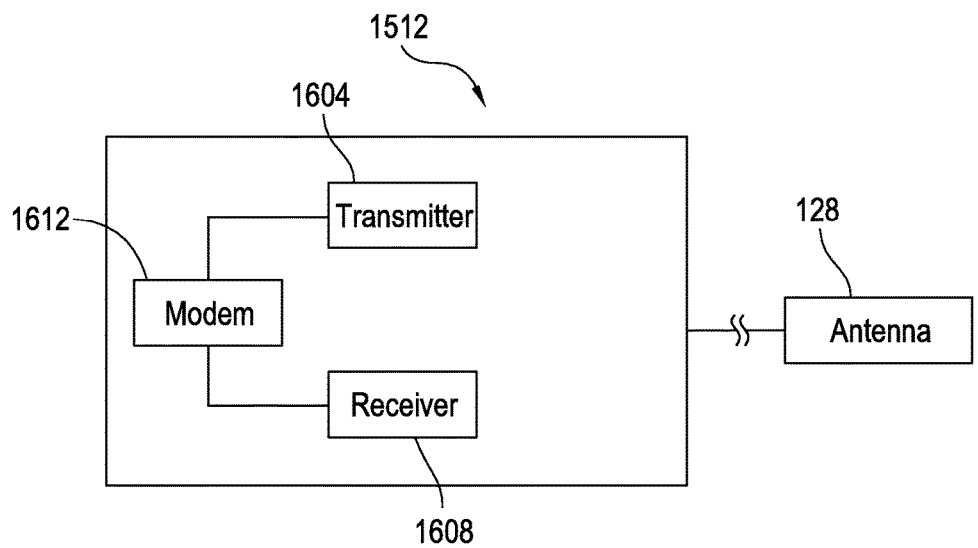
FIG. 16 is a schematic diagram illustrating additional detail for the RF communication interface in FIG. 12.

FIG. 15 illustrates one example of additional aspects of a communication node 1500 which is like communication nodes 112 and 116 illustrated in FIGS. 1 and 2 and discussed above. Communication node 1500 can include a processor 1504 for controlling various aspects of communication node 1500. The processor may be coupled to a memory 1516 useful for storing rules or command data 1520. Devices for accepting user input and providing output (I/O) to a user (1524) may also be included. These devices may include a keyboard or keypad, a mouse, a display such as a flat panel monitor and the like, a printer, plotter, or 3D printer, a camera, or a microphone. Any suitable devices for user I/O may be included. Node 1500 may also include a network interface 1532 responsive to the processor 1504 and coupled to a communication network 1536. A security module 1528 may be included as well and may be used to reduce or eliminate the opportunity for third-parties to intercept, jam, or change data as it passes between communications nodes 1500. In one example, communication node 1500 is implemented as a computer executing software to control the interaction of the various aspects of node 1500.

Network interface 1536 may be configured to send and receive data such as command data 1520, or triggering data which may be passed from a triggering system 1540. Communication network 1536 may be coupled to a network such as the internet and configured to send and receive data without the use of skywave propagation. For example, communication network 1536 may transmit and receive data over optical fibers or other transmission lines running along the earth similar to transmission lines 144 illustrated in previous figures.

Node 1500 may include a second network interface 1508 responsive to processor 1504 and coupled to a radio-frequency communication interface 1512. This second network interface 1508 may be used to transfer data such as command data 1520 or triggering data passed from triggering system 1540. Network interface 1508 may be coupled to an antenna like antenna 128 which may include multiple antennas or antenna elements. The radio-frequency communication interface 1508 may be configured to send and receive data such as triggering data using electromagnetic waves transmitted and/or received via antenna 128. As discussed above, antenna 128 may be configured to send and receive the electromagnetic waves via skywave propagation.

Figure 13:
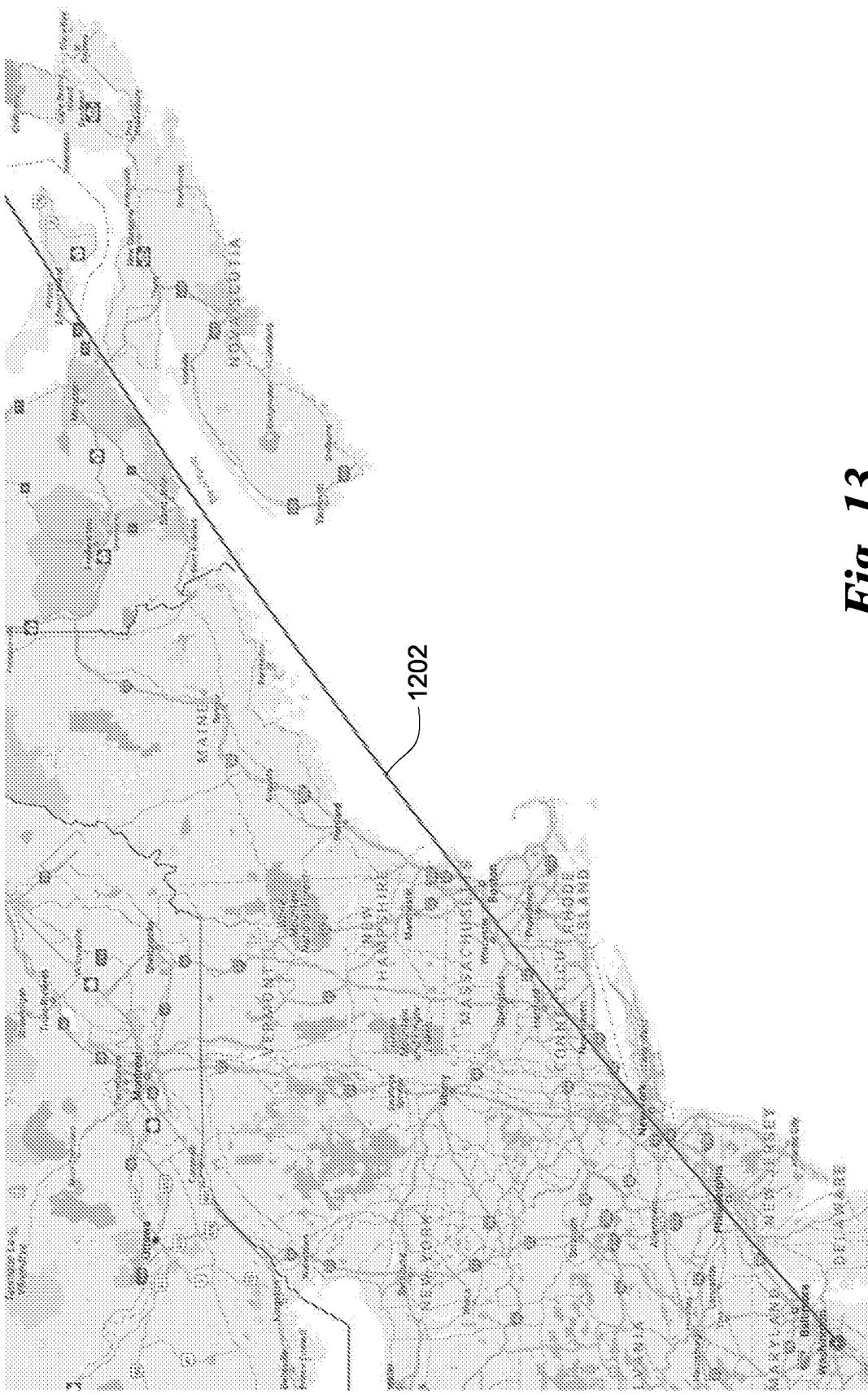
FIG. 13 is a map plot illustrating further detail for the geodesic line of FIG. 12.
Figure 14:
FIG. 14 is a map plot illustrating further detail for the geodesic line of FIG. 12.

Node 1500 may include additional aspects illustrated in FIG. 13. Radio-frequency communication interface 1512 may include a transmitter 1604 configured to transmit electromagnetic energy using antenna 128. Receiver 1608 may optionally be included as well and configured to receive electromagnetic waves from antenna 128. Transmitter 1604 and receiver 1608 may also be coupled to a modem 1612 configured to modulate signals received by interface 1512 to encode information or data from a digital stream for transmission by transmitter 1604. Modem 1612 may also be configured to demodulate signals received by receiver 1608 from antenna 128 to decode the transmitted signal into a digital data stream usable by processor 804 or that may be stored in memory 1516.

In operation, commands or command data may be sent by the disclosed system using a transmitting communications node such as node 112 or node 1500 configured to transmit command data. The system may wait for a triggering event and send triggering data when a triggering event occurs. A receiving communications node (e.g. like nodes 116 or 800) may then execute commands included in the command data accordingly.

Command data may be received or created. For example, the data may be received from a transmitting third-party, or data may be processed by the system itself to generate one or more commands. One example of command data is a collection of one or more trades to be executed by financial exchanges. The commands may include orders to automatically buy and/or sell financial instruments based on various rules or preconditions. These rules or preconditions may include buying or selling if the market is at a certain price, if one or more technical indicators signals a purchase or sale, or if certain market data received from private or government entities contains particular values corresponding to a predetermined level (e.g. "new housing starts", "gross domestic product", interest rates on government bonds, and the like).

A security protocol may optionally be applied to the command data. Such security protocols may include encrypting the command data using public or private key encryption techniques, scrambling the data, and/or applying an encoding algorithm such as two-way hashing, and the like. Any suitable technique for securing command data may be used to make the data unreadable or unusable by third parties.

Command data can be transmitted from a transmitting communication node to a receiving communications node. Any suitable technique for communicating command data may be used such as sending the command data as a series of signals, packets, are datagrams of any suitable size. The transmission of either the command data, or the triggering data (or both) may occur over a low latency low bandwidth communication link such as communication link 104, or over a high latency high-bandwidth communication link such as communication link 108. Command data may also be transmitted by multiple communication links such as communication links 104 and 108 sequentially or at about the same time. The transmitted command data may be received by a receiving communications node using any of the communication links discussed herein. The system may optionally check the integrity of the data received and may optionally coordinate with a transmitting communication node to automatically resend the data if portions of it were not received or were corrupted in transmission.

When command data has been received at a receiving communications node, the commands may be prepared for execution. Such preparation may include upgrading or replacing software stored in a memory on a computer to be executed by a processor or other circuitry when a triggering event occurs. In another example, preparing commands for execution at may include programming a Field Programmable Gate Array (FPGA) to automatically perform the commands. This process may occur by any suitable means such as by performing a firmware upgrade on a computer that uses an FPGA or similar reprogrammable circuitry. When the commands of been prepared for execution, the system may then wait for a triggering event to take place.

The system may execute various other activities while waiting for a triggering event to take place. If no triggering event has occurred, various actions may be taken by a communications node at either end of a communications link, or at both ends. These actions may be the taken continuously while waiting for a triggering event to take place either simultaneously (in parallel), or in a sequential fashion, or in any suitable combination thereof.

For example, the system may determine a maximum usable frequency. This action might be taken to maintain a communication link such as link 104 that communicates via skywave propagation. The maximum usable frequency may be automatically determined experimentally by using a processor like processor 1504 to control transmitter 1604 to send signals over a broad range of frequencies in the electromagnetic spectrum. The processor may also control receiver 1608 to listen for responses from other transmitting communication nodes. The processor may then analyze the signal sent and the responses received to determine the maximum usable frequency that may be used to achieve communication with various remote communications nodes.

In another example, the maximum usable frequency may be predicted or determined by propagation data provided by third parties such as government entities. Such third parties may continuously monitor skywave propagation across a broad range of frequencies and distances providing this propagation data as an aid in calculating skip distances across a range of frequencies in the electromagnetic spectrum. Software modeling of distances, atmospheric conditions, and any other factors impacting propagation may also be used to determine the maximum usable frequency.

The system may determine a minimum usable frequency. The minimum usable frequency may be determined experimentally as described above, or by receiving and processing updated third-party propagation data. The maximum and minimum usable frequencies may then be stored in a memory accessible by the processor.

When the system is waiting for an event, a communication node may transmit a steady stream of signals that may or may not contain any useful data. The signals or data are prepared for transmission, and as discussed above, the transmission may or may not include meaningful command data or triggering data. They communication node may, for example, send a transmission at a regular interval, or with a specific sequence of data. In this way a communication node may maintain a communication link thereby quickly become aware when the communication link is compromised.

Where a communication link uses skywave propagation (such as communication link 104), the system may choose a transmission frequency using the processor or other logic circuit. Choosing a transmission frequency may include selecting a frequency between the minimum and maximum usable frequencies determined previously. This may be done in accordance with a "frequency hopping" system configured to repeatedly choose a different frequency over time for transmitting and receiving. Choosing a transmission frequency may also include selecting a frequency from a predetermined set or range of frequencies such as in a spread spectrum "signal hopping" configuration. The frequency may be determined according to any suitable technique such as by Multiple-input/Multiple-output (MIMO) using multiple transmitters or receivers at different frequencies. The data may then be transmitted once the transmission frequency is determined.

When a triggering event occurs, triggering data can be sent. Triggering data may be prepared which may include extracting or receiving the triggering data from a third-party data source and configuring it for transmission over a communications link such as communication link 104 or 108. A security protocol may be applied to the triggering data to reduce or eliminate the opportunity for third-party individuals to obtain triggering data without authorization. Any suitable security protocol may be applied as discussed herein elsewhere.

A transmission frequency may then be chosen. Examples include selecting a frequency between the maximum and minimum usable frequencies as previously determined, or by selecting a frequency from a predetermined set of frequencies such as in a "signal hopping" configuration. In another example, the system may transmit over multiple frequencies a the same time. The system may then transmit the triggering data at along one or more communications links as discussed herein elsewhere.

A receiving communications node may receive triggering data. A security protocol may be applied to unscramble, decrypt, decode, or otherwise remove any security measures that may have been applied when the triggering data was sent. A processor may then process the triggering data to identify commands to execute based on an identifier sent in the triggering data. Triggering data may also include multiple identifiers identifying multiple commands to execute. The system may then execute the commands identified in the triggering data.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link figured to respond to one another by physical movement of one element in relation to another. In the case of an electrical link, the communication link may be composed of multiple electrical conductors electrically connected to form the communication link.

In the case of an electromagnetic link, elements the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Critical angle" generally refers to the highest angle with respect to a vertical line extending to the center of the Earth at which an electromagnetic wave at a specific frequency can be returned to the Earth using sky-wave propagation.

"Critical Frequency" generally refers to the highest frequency that will be returned to the Earth when transmitted vertically under given ionospheric conditions using sky-wave propagation.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz.

Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation. The electromagnetic spectrum is generally categorized as follows, in order of increasing frequency and energy and decreasing wavelength:

"Extremely low frequency" (ELF) generally designates a band of frequencies from about 3 to about 30 Hz with wavelengths from about 100,000 to 10,000 km long.

"Super low frequency" (SLF) generally designates a band of frequencies generally ranging between about 30 Hz to about 300 Hz with wavelengths of about 10,000 to about 1000 km long.

"Voice frequency" or "voice band" generally designates electromagnetic energy that is audibles to the human ear. Adult males generally speak in the range between about 85 and about 180 Hz while adult females generally converse in the range from about 165 to about 255 Hz.

"Very low frequency" (VLF) generally designates the band of frequencies from about 3 kHz to about 30 kHz with corresponding wavelengths from about 10 to about 100 km long.

"Low-frequency" (LF) generally designates the band of frequencies in the range of about 30 kHz to about 300 kHz with wavelengths range from about 1 to about 10 km.

"Medium frequency" (MF) generally designates the band of frequencies from about 300 kHz to about 3 MHz with wavelengths from about 1000 to about 100 m long.

"High frequency" (HF) generally designates the band of frequencies from about 3 MHz to about 30 MHz having wavelengths from about 100 m to about 10 m long.

"Very high frequency" (VHF) generally designates the band of frequencies from about 30 Hz to about 300 MHz with wavelengths from about 10 m to about 1 m long.

"Ultra high frequency" (UHF) generally designates the band of frequencies from about 300 MHz to about 3 GHz with weight wavelengths ranging from about 1 m to about 10 cm long.

"Super high frequency" (SHF) generally designates the band of frequencies from about 3 GHz to about 30 GHz with wavelengths ranging from about 10 cm to about 1 cm long.

"Extremely high frequency" (EHF) generally designates the band of frequencies from about 30 GHz to about 300 GHz with wavelengths ranging from about 1 cm to about 1 mm long.

"Far infrared" (FIR) generally designates a band of frequencies from about 300 GHz to about 20 THz with wavelengths ranging from about 1 mm to about 15 µm long.

"Long-wavelength infrared" (LWIR) generally designates a band of frequencies from about 20 THz to about 37 THz with wavelengths ranging from about 15 µm to about 8 µm long.

"Mid infrared" (MIR) generally designates a band of frequencies from about 37 THz to about 100 THz with wavelengths from about 8 µm to about 3 µm long.

"Short wavelength infrared" (SWIR) generally designates a band of frequencies from about 100 THz to about 214 THz with wavelengths from about 3 µm to about 1.4 µm long "Near-infrared" (NIR) generally designates a band of frequencies from about 214 THz to about 400 THz with wavelengths from about 1.4 µm to about 750 nm long.

"Visible light" generally designates a band of frequencies from about 400 THz to about 750 THz with wavelengths from about 750 nm to about 400 nm long.

"Near ultraviolet" (NUV) generally designates a band of frequencies from about 750 THz to about 1 PHz with wavelengths from about 400 nm to about 300 nm long.

"Middle ultraviolet" (MUV) generally designates a band of frequencies from about 1 PHz to about 1.5 PHz with wavelengths from about 300 nm to about 200 nm long.

"Far ultraviolet" (FUV) generally designates a band of frequencies from about 1.5 PHz to about 2.48 PHz with wavelengths from about 200 nm to about 122 nm long.

"Extreme ultraviolet" (EUV) generally designates a band of frequencies from about 2.48 PHz to about 30 PHz with wavelengths from about 121 nm to about 10 nm long.

"Soft x-rays" (SX) generally designates a band of frequencies from about 30 PHz to about 3 EHz with wavelengths from about 10 nm to about 100 pm long.

"Hard x-rays" (HX) generally designates a band of frequencies from about 3 EHz to about 30 EHz with wavelengths from about 100 pm to about 10 pm long.

"Gamma rays" generally designates a band of frequencies above about 30 EHz with wavelengths less than about 10 pm long.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Frequency Bandwidth" or "Band" generally refers to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Fiber-optic communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Ground" is used more in an electrical/electromagnetic sense and generally refers to the Earth's surface including land and bodies of water, such as oceans, lakes, and rivers.

"Ground-wave propagation" generally refers to a transmission method in which one or more electromagnetic waves are conducted via the boundary of the ground and atmosphere to travel along ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those.

The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending among a number of factors including solar activity, such as sunspots. The various layers of the ionosphere are identified below.

The "D layer" of the ionosphere is the innermost layer that ranges from about 25 miles (40 km) to about 55 miles (90 km) above the Earth's surface. The layer has the ability to refract signals of low frequencies, but it allows high frequency radio signals to pass through with some attenuation. The D layer normally, but not in all instances, disappears rapidly after sunset due to rapid recombination of its ions.

The "E layer" of the ionosphere is the middle layer that ranges from about 55 miles (90 km) to about 90 miles (145 km) above the Earth's surface. The E layer typically has the ability to refract signals with frequencies higher than the D layer. Depending on the conditions, the E layer can normally refract frequencies up to 20 MHz. The rate of ionic recombination in the E layer is somewhat rapid such that after sunset it almost completely disappears by midnight. The E layer can further include what is termed an "$E_s$-layer" or "sporadic E layer" that is formed by small, thin clouds of intense ionization. The sporadic E layer can reflect radio waves, even frequencies up to 225 MHz, although rarely. Sporadic E layers most often form during summer months, and it has skip distances of around 1,020 miles (1,640 km). With the sporadic E layer, one hop propagation can be about 560 miles (900 km) to up to 1,600 miles (2,500 km), and double hop propagation can be over 2,200 miles (3,500 km).

The "F layer" of the ionosphere is the top layer that ranges from about 90 (145 km) to 310 miles (500 km) or more above the Earth's surface. The ionization in the F layer is typically quite high and varies widely during the day, with the highest ionization occurring usually around noon. During daylight, the F layer separates into two layers, the $F_1$ layer and the $F_2$ layer. The $F_2$ layer is outermost layer and, as such, is located higher than the $F_1$ layer. Given the atmosphere is rarified at these altitudes, the recombination of ions occur slowly such that F layer remains constantly ionized, either day or night such that most (but not all) skywave propagation of radio waves occur in the F layer, thereby facilitating high frequency (HF) or short wave communication over long distances. For example, the F layers are able to refract high frequency, long distance transmissions for frequencies up to 30 MHz.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{low} \leq \frac{d}{c} \cdot k \quad \text{(Equation 1)}$$

where:
d=distance (miles)
c=the speed of light in a vacuum (186,000 miles/sec)
k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k \quad \text{(Equation 2)}$$

where:
d=distance (miles)
c=the speed of light in a vacuum (186,000 miles/sec)
k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the Earth using sky-wave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Non-sky-wave propagation" generally refers to all forms of transmission, wired and/or wireless, in which the information is not transmitted by reflecting an electromagnetic wave from the ionosphere.

"Optimum Working Frequency" generally refers to the frequency that provides the most consistent communication path via sky-wave propagation. It can vary over time depending on number of factors, such as ionospheric conditions and time of day. For transmissions using the $F_2$ layer of the ionosphere the working frequency is generally around 85% of the MUF, and for the E layer, the optimum working frequency will generally be near the MUF.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core.

Optical fibers are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through optical fibers include electromagnetic waves in the near-infrared, mid-infrared, and visible light portion of the electromagnetic spectrum, although electromagnetic energy of any suitable frequency may be used.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted abstention the vertically, and a different polarization when mounted substantially horizontally. As a transverse wave, the magnetic field of a radio wave is at right angles to that of the electric field, but by convention, talk of an antenna's "polarization" is understood to refer to the direction of the electric field.

Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location. Matching the receiving antenna's polarization to that of the transmitter may be especially important in ground wave or line of sight propagation but may be less important in skywave propagation.

An antenna's linear polarization is generally along the direction (as viewed from the receiving location) of the antenna's currents when such a direction can be defined. For instance, a vertical whip antenna or Wi-Fi antenna vertically oriented will transmit and receive in the vertical polarization. Antennas with horizontal elements, such as most rooftop TV antennas, are generally horizontally polarized (because broadcast TV usually uses horizontal polarization). Even when the antenna system has a vertical orientation, such as an array of horizontal dipole antennas, the polarization is in the horizontal direction corresponding to the current flow.

Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) as we have discussed above, and circular polarization (in which the two axes of the ellipse are equal). In linear polarization the electric field of the radio wave oscillates back and forth along one direction; this can be affected by the mounting of the antenna but usually the desired direction is either horizontal or vertical polarization. In circular polarization, the electric field (and magnetic field) of the radio wave rotates At the radio frequency circularly around the axis of propagation.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Radio" generally refers to electromagnetic radiation in the frequencies that occupy the range from 3 kHz to 300 GHz.

"Radio horizon" generally refers the locus of points at which direct rays from an antenna are tangential to the ground. The radio horizon can be approximated by the following equation:

$$d \approx \sqrt{2h_t} + \sqrt{2h_r}$$ (Equation 3)

where:
d=radio horizon (miles)
$h_t$=transmitting antenna height (feet)
$h_r$=receiving antenna height (feet).

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Skip distance" generally refers to the minimum distance from a transmitter to where a wave from sky-wave propagation can be returned to the Earth. To put it another way, the skip distance is the minimum distance that occurs at the critical angle for sky-wave propagation.

"Skip zone" or "quiet zone" generally refers to is an area between the location where a ground wave from ground wave propagation is completely dissipated and the location where the first sky wave returns using sky wave propagation. In the skip zone, no signal for a given transmission can be received.

"Satellite communication" or "satellite propagation" generally refers to transmitting one or more electromagnetic signals to a satellite which in turn reflects and/or retransmits the signal to another satellite or station.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units.

For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Sky-wave propagation" refers generally to a transmission method in which one or more electromagnetic-waves radiated from an antenna are refracted from the ionosphere back to the ground. Sky-wave propagation further includes tropospheric scatter transmissions. In one form, a skipping method can be used in which the waves refracted from the ionosphere are reflected by the ground back up to the ionosphere. This skipping can occur more than once.

"Space-wave propagation" or sometimes referred to as "direct wave propagation" or "line-of-sight propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4⁄5 greater than the geometric line of sight.

"Spread spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the Earth's atmosphere extending from the troposphere to about 25 to 35 miles above the earth surface.

"Transfer Rate" generally refers to the rate at which a something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line.

Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-site, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the Earth's atmosphere. The troposphere extends about 11 miles above the surface of the earth in the mid-latitudes, up to 12 miles in the tropics, and about 4.3 miles in winter at the poles.

"Tropospheric scatter transmission" generally refers to a form of sky-wave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

The invention claimed is:

1. A system, comprising:
a communication link having an optic fiber passing between a transmitting station and a receiving station, wherein the communication link is configured to send command data between the transmitting station and the receiving station using the optic fiber, the command data including one or more commands;
a transmitting antenna coupled to the transmitting station and located at a transmitting site;
a receiving antenna coupled to the receiving station, the receiving antenna located remote from the transmitting antenna;
wherein the transmitting antenna is positioned where ground slopes downwardly away from the transmitting antenna and in the direction of the receiving antenna;
wherein the transmitting station and the receiving station communicate via skywave propagation;
wherein the transmitting antenna and receiving antenna are separated by at least one skip zone;
wherein the transmitting station is configured to wirelessly send triggering data from the transmitting station to the receiving station;
wherein the triggering data includes an identifier identifying at least one of the one or more commands;
wherein the command data is defined by a first collection of data, wherein the first collection of data has a first overall size, wherein the triggering data is defined by a second collection of data, wherein the second collection of data has a second overall size, and the first overall size is greater than or equal to the second overall size;
wherein the transmitting antenna is mounted to a tower operable to raise or lower to adjust the height of the transmitting antenna above the ground;
wherein the transmitting antenna is configured to transmit the triggering data via the skywave propagation via a transmitted signal, wherein the transmitting antenna has radiating elements directing electromagnetic energy in a direction of a forward lobe that extends along an angle of propagation, wherein the angle of propagation is directed away from the ground and towards an ionosphere;
wherein a portion of the transmitted signal reflects from the ground to create a reflected signal; and
wherein the transmitting station is configured to adjust a height of the transmitting antenna where the transmitted signal and the reflected signal coincide to increase signal strength at the forward lobe of the transmitting antenna.

2. The system of claim 1, wherein the transmitting antenna and the receiving antenna are at least one skip zone apart at a predetermined frequency and propagation angle.

3. The system of claim 1, wherein the downward slope angles down about 3 degrees from the horizontal.

4. The system of claim 1, wherein the downward slope ends in a body of water with a salinity of between about 30 and about 40 parts per thousand.

5. The system of claim 1, wherein the transmitting antenna is mounted on a tower, and wherein the tower is operable to raise or lower to adjust the height of the transmitting antenna above the ground.

6. The system of claim 1, wherein the transmitting antenna is mounted on a tower that is surrounded by water.

7. The system of claim 6, wherein the tower is mounted to a flotation device positioned in a body of water with a salinity of between about 30 and about 40 parts per thousand.

8. The system of claim 1, wherein:
the transmitting antenna and the receiving antenna are separated by a transmitting-receiving distance;
the transmitting station is configured to transmit the triggering data at a frequency where the transmitting-receiving distance is evenly divisible by a skip distance for the frequency; and
the transmitting antenna and the receiving antenna are aligned along a geodesic line.

9. The system of claim 1, wherein the transmitting station is configured to transmit at a frequency where the transmitted signal refracts from the ionosphere via the skywave propagation.

10. The system of claim 1, wherein:
the downward slope of the ground angles down from the antenna is about 3 degrees from horizontal; and
the transmitting antenna and the receiving antenna are aligned along a geodesic line.

11. A system, comprising:
a communication link having an optic fiber passing between a transmitting station and a receiving station, wherein the communication link is configured to send command data between the transmitting station and the receiving station using the optic fiber, the command data including one or more commands;
a transmitting antenna coupled to the transmitting station and located at a transmitting site;

a receiving antenna coupled to the receiving station, the receiving antenna located remote from the transmitting antenna;

wherein the transmitting antenna is positioned where ground slopes downwardly away from the transmitting antenna and in the direction of the receiving antenna;

wherein the transmitting station and the receiving station communicate via skywave propagation;

wherein the transmitting antenna and receiving antenna are separated by at least one skip zone;

wherein the transmitting station is configured to wirelessly send triggering data from the transmitting station to the receiving station;

wherein the triggering data includes an identifier identifying at least one of the one or more commands;

wherein the command data is defined by a first collection of data, wherein the first collection of data has a first overall size, wherein the triggering data is defined by a second collection of data, wherein the second collection of data has a second overall size, and the first overall size is greater than or equal to the second overall size;

wherein the downward slope of the ground angles down from the antenna is about 3 degrees from horizontal; and wherein the transmitting antenna and the receiving antenna are aligned along a geodesic line.

12. The system of claim 11, wherein the transmitting antenna and the receiving antenna are at least one skip zone apart at a predetermined frequency and propagation angle.

13. The system of claim 12, wherein:
the transmitting antenna and the receiving antenna are separated by a transmitting-receiving distance; and
the transmitting station is configured to transmit the triggering data at a frequency where the transmitting-receiving distance is evenly divisible by a skip distance for the frequency.

14. The system of claim 11, wherein the downward slope ends in a body of water with a salinity of between about 30 and about 40 parts per thousand.

15. The system of claim 11, wherein:
the transmitting antenna is configured to transmit the triggering data via the skywave propagation via a transmitted signal;
a portion of the transmitted signal reflects from the ground to create a reflected signal;
the transmitting station is configured to adjust a height of the transmitting antenna where the transmitted signal and the reflected signal coincide to increase signal strength at a forward lobe of the transmitting antenna;
the transmitting station is configured to adjust a height of the transmitting station above the ground; and
the transmitting station is configured to adjust a frequency of the transmitted signal and the height of the antenna to maximize signal strength at an angle of propagation.

* * * * *